United States Patent
Tsuda

(10) Patent No.: US 12,192,957 B2
(45) Date of Patent: Jan. 7, 2025

(54) WIRELESS COMMUNICATION DEVICE, BASE STATION, AND COMMUNICATION CONTROL METHOD

(71) Applicant: Sony Group Corporation, Tokyo (JP)

(72) Inventor: Shinichiro Tsuda, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 400 days.

(21) Appl. No.: 17/636,367

(22) PCT Filed: Sep. 9, 2020

(86) PCT No.: PCT/JP2020/034094
§ 371 (c)(1),
(2) Date: Feb. 18, 2022

(87) PCT Pub. No.: WO2021/054218
PCT Pub. Date: Mar. 25, 2021

(65) Prior Publication Data
US 2022/0303945 A1  Sep. 22, 2022

(30) Foreign Application Priority Data
Sep. 20, 2019 (JP) ................................. 2019-171803

(51) Int. Cl.
*H04W 68/00* (2009.01)
*H04W 60/04* (2009.01)
(Continued)

(52) U.S. Cl.
CPC ......... *H04W 68/005* (2013.01); *H04W 60/04* (2013.01); *H04W 76/20* (2018.02); *H04W 84/042* (2013.01)

(58) Field of Classification Search
CPC ... H04W 68/005; H04W 88/06; H04W 76/15; H04W 80/10; H04W 60/04; H04W 76/20; H04W 8/183; H04W 12/50
See application file for complete search history.

(56) References Cited

U.S. PATENT DOCUMENTS

2010/0203906 A1  8/2010  Fang
2012/0077494 A1*  3/2012  Kim .................... H04W 60/005
                                                          455/435.1

(Continued)

FOREIGN PATENT DOCUMENTS

CN    102282898 A    12/2011
CN    102934513 A     2/2013

(Continued)

OTHER PUBLICATIONS

"5G; NR; User Equipment (UE) procedures in idle mode and in RRC Inactive state (3GPP TS 38.304 version 15.4.0 Release 15)", ETSI Technical Specification, European Telecommunications Standards Institute (ETSI), 650 Route Des Lucioles; F-06921 Sophia-Antipolis; France vol. 3GPP RAN, No. V15.4.0 Jul. 25, 2019 (Jul. 25, 2019), pp. 1-31, XP014350657.

(Continued)

*Primary Examiner* — Iqbal Zaidi
(74) *Attorney, Agent, or Firm* — XSENSUS LLP

(57) ABSTRACT

A wireless communication device (100) according to the present disclosure includes a controller (140). The controller (140) transmits a registration request message to a first management device (10A) that belongs to a first PLMN and that manages registration of a wireless communication device (100). The registration request message includes second PLMN_ID information. The second PLMN_ID information is also included in the first PLMN list information that is stored in the second subscriber identity module and that is stored in the first subscriber identity module. The (Continued)

controller (140) receives, from a first base station (200A) that belongs to the first PLMN, a first paging message related to a first paging that has been generated in the first PLMN. The controller (140) receives, from the first base station (200A), a second paging message related to a second paging that has been generated in a second PLMN.

12 Claims, 22 Drawing Sheets

(51) Int. Cl.
*H04W 76/20* (2018.01)
*H04W 84/04* (2009.01)

(56) References Cited

U.S. PATENT DOCUMENTS

| | | |
|---|---|---|
| 2012/0108273 A1 | 5/2012 | Lee |
| 2013/0303203 A1 | 11/2013 | Wang et al. |
| 2014/0274047 A1 | 9/2014 | Dhanda |
| 2015/0065132 A1 | 3/2015 | Ramkumar |
| 2015/0141012 A1 | 5/2015 | Ramkumar |
| 2019/0159116 A1* | 5/2019 | Guan ................ H04W 60/00 |
| 2023/0108625 A1* | 4/2023 | Yi ..................... H04W 76/15 |
| | | 370/328 |

FOREIGN PATENT DOCUMENTS

| | | | |
|---|---|---|---|
| CN | 103262625 | A | 8/2013 |
| CN | 105493574 | A | 4/2016 |
| CN | 106028368 | A | 10/2016 |
| CN | 106464611 | A | 2/2017 |
| CN | 109076453 | A | 12/2018 |
| CN | 110024444 | A | 7/2019 |
| EP | 2590459 | A1 | 5/2013 |
| WO | 2015/180134 | A1 | 12/2015 |
| WO | WO-2017158440 | A1 | 9/2017 |
| WO | 2018/125533 | A1 | 7/2018 |
| WO | WO-2018161244 | A1 | 9/2018 |
| WO | WO-2019161537 | A1 | 8/2019 |

OTHER PUBLICATIONS

International Search Report and Written Opinion mailed on Dec. 15, 2020, received for PCT Application PCT/JP2020/034094, Filed on Sep. 9, 2020, 9 pages including English Translation.

* cited by examiner

WIRELESS COMMUNICATION DEVICE, BASE STATION, AND COMMUNICATION CONTROL METHOD

CROSS-REFERENCE TO RELATED APPLICATIONS

The present application is based on PCT filing PCT/JP2020/034094, filed Sep. 9, 2020, which claims priority to JP 2019-171803, filed Sep. 20, 2019, the entire contents of each are incorporated herein by reference.

FIELD

The present disclosure relates to a wireless communication device, a base station, and a communication control method.

BACKGROUND

In recent years, a technology for mounting a plurality of subscriber identity modules (SIMs) on user equipment (UE) and connecting one piece of UE with networks of a plurality of communication carriers has been proposed. In such a technology, in a case where the UE includes only one transmission and reception unit, the UE is not capable of simultaneously connecting with networks of different communication carriers. For example, even in a case where the UE is equipped with two SIMs and is capable of connecting with two networks, if the UE is provided with only one transmission and reception unit, while the UE is connected with one of the networks, the UE cannot receive a paging from the other one of the networks.

Therefore, there has been proposed a technology in which by sharing information with a plurality of networks, the UE is simultaneously connected with the plurality of networks (see, for example, Patent Literature 1). In such a technology, by providing one of the networks with paging information from the other one of the networks, the UE is capable of receiving, through one of the networks, the paging from the other one of the networks with which the UE is not directly connected.

CITATION LIST

Patent Literature

Patent Literature 1: US 2013/0303203 A

SUMMARY

Technical Problem

The above related art, however, discloses that the networks share the paging information. However, it cannot be said that a specific mechanism of how the UE receives the paging from a plurality of networks has been sufficiently studied.

Therefore, the present disclosure proposes a mechanism by which the UE equipped with a plurality of SIMs is capable of receiving the paging from a plurality of networks.

Solution to Problem

According to the present disclosure, A wireless communication device is provided. The wireless communication device includes a controller. The controller transmits a registration request message to a first management device that belongs to a first PLMN and that manages registration of a wireless communication device. The registration request message includes second PLMN_ID information. The second PLMN_ID information is also included in the first PLMN list information that is stored in the second subscriber identity module and that is stored in the first subscriber identity module. The controller receives, from a first base station that belongs to the first PLMN, a first paging message related to a first paging that has been generated in the first PLMN. The controller receives, from the first base station, a second paging message related to a second paging that has been generated in a second PLMN.

DESCRIPTION OF EMBODIMENTS

Figure 1:
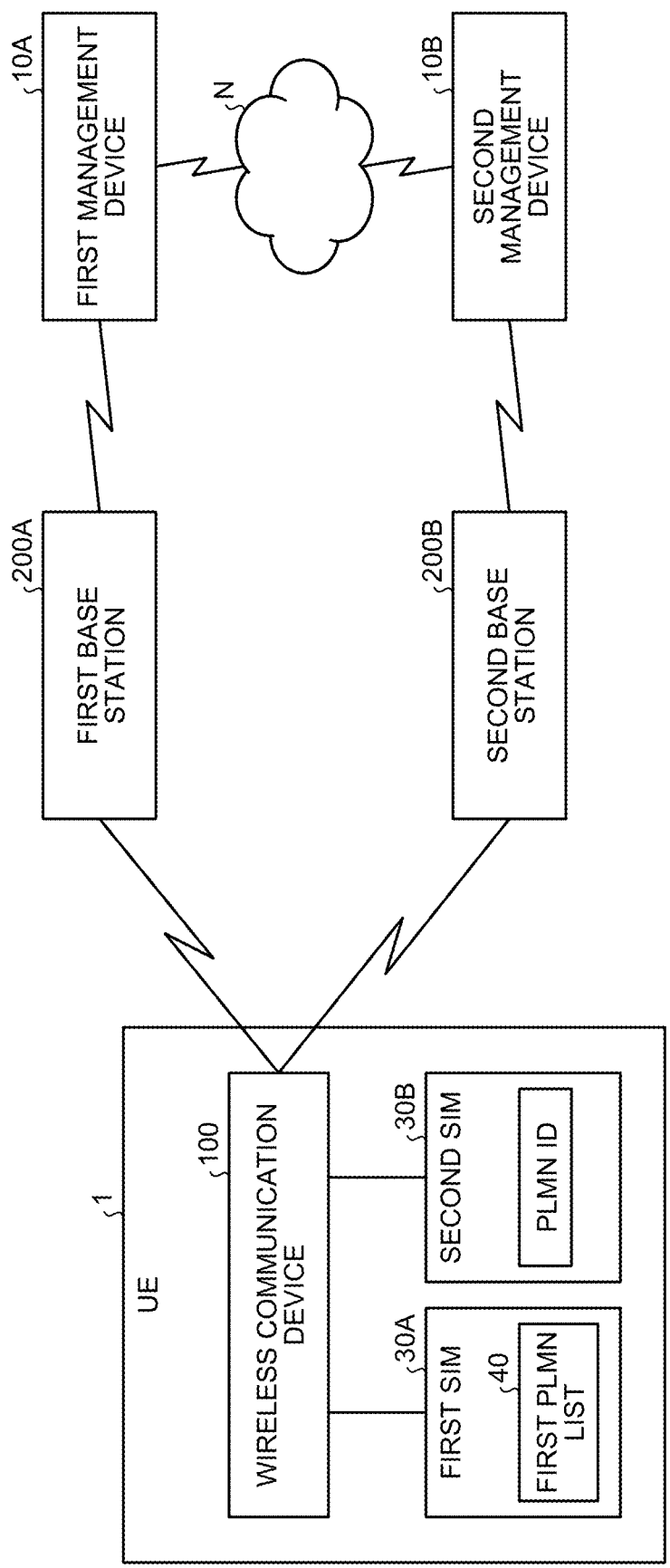
FIG. 1 is a diagram illustrating an example of a communication system according to an embodiment of the present disclosure.

Hereinafter, embodiments of the present disclosure will be described in detail with reference to the drawings. Note that in each of the following embodiments, the same parts are denoted by the same reference numerals, and overlapping descriptions will be omitted.

In addition, in the present specification and the drawings, a plurality of constituent elements having substantially the same functional configuration may be distinguished by attaching different alphabets after the same reference numeral. For example, a plurality of configurations having substantially the same functional configuration is distinguished as the management devices 10A and 10B as necessary. However, in a case where it is not particularly necessary to distinguish each of a plurality of constituent elements having substantially the same functional configuration, only the same reference numeral is attached. For example, in a case where it is not necessary to particularly distinguish the management devices 10A and 10B, the management devices are simply referred to as a management device 10.

In addition, the present disclosure will be described in accordance with the following item order.

1. Introduction
2. Outline of communication system
2.1. Outline of system configuration
2.2. Outline of registration process
2.3. Outline of monitoring process
3. Configuration of communication system
3.1. Configuration example of network architecture
3.2. Configuration example of management device
3.3. Configuration example of base station
3.4. Configuration example of wireless communication device
4. Operation of communication system
4.1. Registration selection process
4.2. Details of registration selection process
4.3. Registration process
4.4. Paging monitoring process
   4.4.1. Types of paging
   4.4.2. Case of registration in first registration process
   4.4.3. Case of registration in second registration process
      4.4.3.1. First example of paging frame PF
      4.4.3.2. Second example of paging frame PF
      4.4.3.3. Third example of paging frame PF
5. Application example
5.1. Application example in relation to radio access technology
   5.1.1. Application example to LTE
   5.1.2. Application example in case where LTE and NR are both present
5.2. Application example in relation to wireless communication device
5.3. Other application examples
6. Modifications
7. Conclusion <1. Introduction>

Radio access technologies such as long term evolution (LTE) and new radio (NR) have been studied in the 3rd Generation Partnership Project (3GPP). LTE and NR are each a type of cellular communication technology, and a plurality of areas covered by a base station are each arranged in a cell shape to enable mobile communication of a terminal device (UE). Note that in the following description, it is assumed that "LTE" includes LTE-advanced (LTE-A), LTE-advanced pro (LTE-A Pro), and evolved universal terrestrial radio access (EUTRA). It is also assumed that NR includes new radio access technology (NRAT) and further EUTRA (FEUTRA).

NR is a radio access technology (RAT) of a next generation (fifth generation) of LTE. NR is a radio access technology capable of handling various use cases including enhanced mobile broadband (eMBB), massive machine type communications (mMTC), and ultra-reliable and low latency communications (URLLC). NR is studied for aiming at a technical framework corresponding to use scenarios, required conditions, arrangement scenarios, and the like in these use cases.

Furthermore, in NR, studies of a non-terrestrial network (NTN) have started due to an increase in demand for wide-area coverage, connection stability, and the like. In a non-terrestrial network, a wireless network is planned to be provided for terminal devices via a base station, other than a ground station, such as a satellite station or an aircraft station. The base station other than the ground station is referred to as a non-ground station or a non-ground base station. A wireless network provided by the ground station is referred to as a terrestrial network (TN). By using an identical radio access scheme for the terrestrial network and the non-terrestrial network, an integrated operation of the terrestrial network and the non-terrestrial network is enabled. Here, the base station, other than the ground station, such as the satellite station or the aircraft station, also includes a relay station mounted on a satellite, an aircraft, or an object moving in the air.

Note that in an embodiment of the present disclosure, the ground station (also referred to as the ground base station) refers to a base station (including a relay station) installed on the ground. The "ground" means on the ground in a broad sense including not only the ground (land) but also underground, water surface, and underwater, and may also be a concept including the inside or the outside of a building or a vehicle on the ground.

<2. Outline of Communication System>
<2.1. Outline of System Configuration>

An outline of a communication system according to an embodiment of the present disclosure will be described with reference to FIG. 1. FIG. 1 is a diagram illustrating an example of a communication system according to an embodiment of the present disclosure. As illustrated in FIG. 1, the communication system includes UE 1, first and second subscriber identity modules (hereinafter, also referred to as first and second SIMs 30A and 30B, respectively) mounted on the UE 1, first and second base stations 200A and 200B, and first and second management devices 10A and 10B.

Note that hereinafter, in order to simplify the description, a case where two SIMs 30 (dual SIM) are mounted on the UE 1 will be described as an example. However, it is sufficient if a plurality of SIMs 30 are mounted on the UE 1, and three or more SIMs may be mounted.

The first and second management devices 10A and 10B are network devices that manage a plurality of pieces of the UE 1. Either one of the first management device 10A or the second management device 10B is a device that functions as either a mobility management entity (MME) in LTE or an access and mobility management function (AMF) in NR. The MME is one of logical nodes in a core network of evolved packet core (EPC) in LTE. In addition, the AMF is one of logical nodes in a core network of 5GC (5G core) in NR. Note that any one of the first and second management devices 10A and 10B is not limited to a mobility management entity (MME) in LTE or an access and mobility management function (AMF) in NR, and may be, for example, another core network node. For example, any one of the first and second management devices 10A and 10B may be a session management function (SMF) in NR.

In the present embodiment, it is assumed that the first and second management devices 10A and 10B are respectively operated by different first and second mobile network operators (MNOs), without limitation to this. The first MNO and the second MNO may be the same MNO. Note that it is assumed that the first and second management devices 10A and 10B communicate with each other through a network N, for example.

The first and second base stations 200A and 200B are apparatuses that perform radio communication with a plurality of pieces of the UE 1. The first and second base stations 200A and 200B are each an apparatus that functions as, for example, an evolved NodeB (eNB) in LTE or a gNB in NR. One or more eNBs constitute an evolved UMTS radio access network (EUTRAN). Therefore, the first and second base stations 200A and 200B may also be each referred to as an EUTRAN node. Furthermore, an EUTRAN may include a gNB (en-gNB) connected with the EPC. That is, the first and second base stations 200A and 200B may be each an en-gNB. Similarly, one or more gNBs constitute a next generation RAN (NGRAN). Therefore, the first and second base stations 200A and 200B may also be each referred to as an NGRAN node. Furthermore, the NGRAN may include a gNB (en-gNB) connected with the SGC. That is, the first and second base stations 200A and 200B may be each an ng-eNB.

A network including a RAN including a first base station 200A, and a core network to which the first management device 10A belongs is referred to as a first network 20A. The first network 20A is operated by the first MNO. That is, the first network 20A is identifiable by a first PLMN. In addition, a network including a RAN including a second base station 200B, and a core network to which the second management device 10B belongs is referred to as a second network 20B. The second network 20B is operated by the second MNO. That is, the second network 20B is identifiable by a second PLMN. Note that hereinafter, each embodiment will be disclosed by assuming that the first MNO and the second MNO are different MNOs, but they may be the same MNO. That is, the first PLMN and the second PLMN may be different PLMNs, or may be the same PLMN.

The first and second networks 20A and 20B are each, for example, an evolved packet system (EPS) in LTE, and are each a 5G system (5GS)/next generation system (NGS) in NR.

The first and second MNOs may operate the respective networks by using different radio access technologies, or may operate the respective networks by using the same radio access technology. For example, the first MNO may provide the UE 1 with a radio service in accordance with the radio communication scheme of LTE, and the second MNO may provide the UE 1 with a radio service in accordance with the radio communication scheme of the NR. In this manner, the first and second MNOs may not necessarily adopt the same wireless communication scheme. Instead of this, the first MNO and the second MNO may respectively provide wireless services in accordance with the same NR wireless communication scheme.

The first SIM 30A stores information for a user who uses the UE 1 to use the service provided by the first MNO. The first SIM 30A stores, for example, a list (a first PLMN list 40) of public land mobile networks (PLMNs) with which the UE 1 is connectable.

The first PLMN list 40 includes, for example, IDs (PLMN IDs) for identifying a plurality of connectable PLMNs. For example, the first PLMN list 40 includes, in addition to a first PLMN ID held by the first MNO, a PLMN ID held by an MNO with which the first MNO has a roaming agreement.

The second SIM 30B stores information for the user who uses the UE 1 to use the service provided by the second MNO. The second SIM 30B stores, for example, an ID (PLMN ID) for identifying a PLMN with which the UE 1 is connectable. Note that FIG. 1 illustrates an example in which the second SIM 30B stores one PLMN ID. However, the second SIM 30B may store a plurality of PLMN IDs. In this case, for example, it is assumed that the second SIM 30B stores a second PLMN list in a similar manner to the first SIM 30A.

The UE 1 is equipped with the first and second SIMs 30A and 30B. In addition, the UE 1 includes a wireless communication device 100. The wireless communication device 100 is alternatively connected with either one of the first network 20A or the second network 20B based on the information stored in the first and second SIMs 30A and 30B, and performs communication.

In some embodiments, the UE 1 is equipped with two SIMs 30, but is not capable of directly connecting with the first and second networks 20A and 20B at the same time, and communicates with either one of them. In other words, the UE 1 conducts communication with the first and second networks 20A and 20B in a time-division manner. However, without limitation to this, each embodiment is applicable, even in a case where the UE 1 is configured to be directly connected with the first and second networks 20A and 20B at the same time.

<2.2. Outline of Registration Process>

Figure 2:
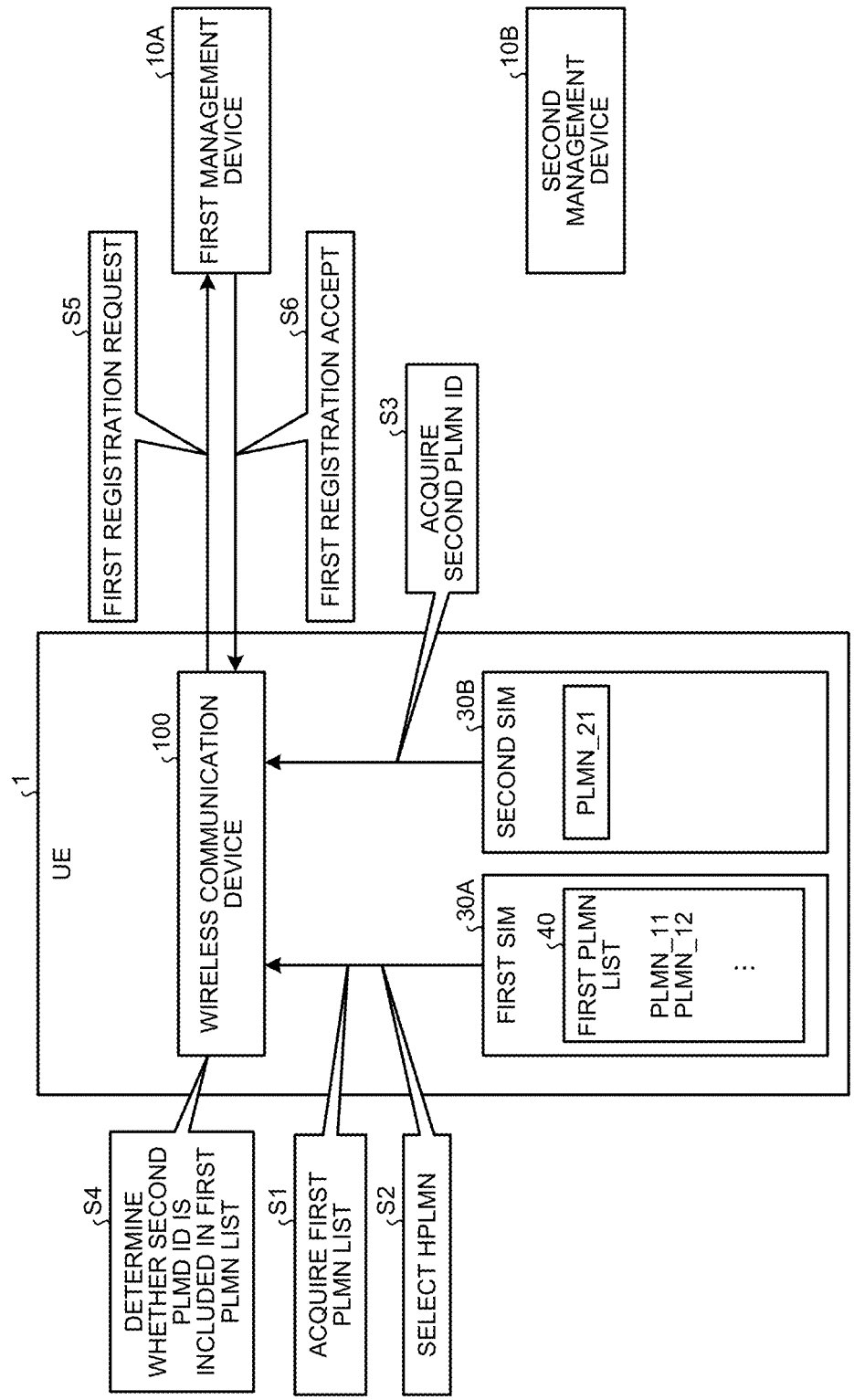
FIG. 2 is a diagram (1) illustrating an example of a registration process according to an embodiment of the present disclosure.
Figure 3:
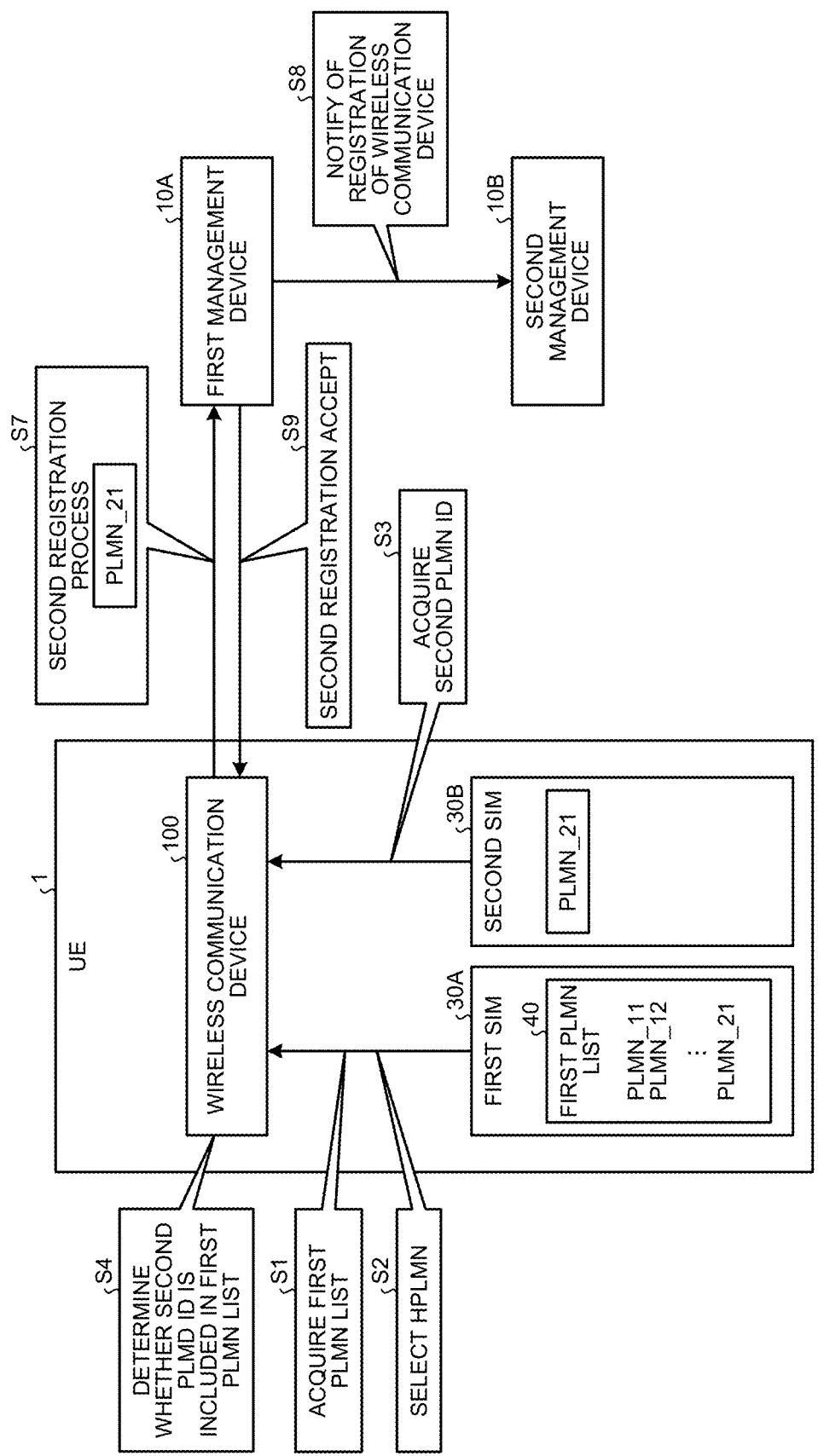
FIG. 3 is a diagram (2) illustrating an example of the registration process according to an embodiment of the present disclosure.

Next, an outline of a registration process according to an embodiment of the present disclosure will be described with reference to FIGS. 2 and 3. FIG. 2 is a diagram (1) illustrating an example of a registration process according to an embodiment of the present disclosure. FIG. 3 is a diagram (2) illustrating an example of the registration process according to an embodiment of the present disclosure.

The registration process according to an embodiment of the present disclosure is achieved by the wireless communication device 100 of the UE 1. Note that here, a description will also be given briefly with regard to a process of the first management device 10A that has received a registration request made by the wireless communication device 100, in addition to the registration process by the wireless communication device 100.

In addition, here, it is assumed that the wireless communication device 100 makes the registration request to the first management device 10A in order to connect with the first network 20A and intend to receive a service provided by the first MNO.

In addition, whether the UE 1 is capable of receiving the service provided by the second MNO through the first network 20A differs depending on whether the first and second MNOs have a roaming agreement, for example. Therefore, first, with reference to FIG. 2, a description will be given with regard to, for example, a case where the first and second MNOs do not have the roaming agreement, and the wireless communication device 100 is not capable of receiving the service provided by the second MNO through the first network 20A. Subsequently, with reference to FIG. 3, a description will be given with regard to, for example, a case where the first and second MNOs have the roaming agreement, and the wireless communication device 100 is capable of receiving the service provided by the second MNO through the first network 20A.

As illustrated in FIG. 2, the wireless communication device 100 (also referred to as mobile equipment) acquires the first PLMN list 40 from the first SIM 30A (Step S1). The first PLMN list 40 includes, in addition to the first PLMN ID of the first MNO, a PLMN ID of an MNO that has the roaming agreement with the first MNO. In this manner, the first PLMN list 40 includes a plurality of PLMN IDs.

The wireless communication device 100 selects a Home PLMN (HPLMN) from the first PLMN list 40 (Step S2). The wireless communication device 100 selects, as the HPLMN, a PLMN ID that is available and that has a high priority from a plurality of PLMN IDs included in the first PLMN list 40.

Subsequently, the wireless communication device 100 acquires a second PLMN ID from the second SIM 30B (Step S3). In the example of FIG. 2, the wireless communication device 100 acquires "PLMN_21" as the second PLMN ID. Note that here, the wireless communication device 100 acquires the second PLMN ID. However, without limitation to this, for example, the wireless communication device 100 may acquire the second PLMN list from the second SIM 30B. Here, the second PLMN list can include, for example, a plurality of PLMN IDs, in addition to the second PLMN ID.

The wireless communication device 100 determines whether the second PLMN ID that has been acquired from the second SIM 30B is included in the first PLMN list 40 (Step S4). In the example illustrated in FIG. 2, the first and second MNOs do not have the roaming agreement, and the service of the second MNO through the first network 20A is not available. Hence, the second PLMN ID (PLMN_21) is not included in the first PLMN list 40.

In this case, the wireless communication device 100 makes (transmits) a first registration (registration) request to the first management device 10A, which belongs to the HPLMN (Step S5). The first registration request here is an Attach request in LTE, and is a Registration request in NR.

When receiving the first registration request from the wireless communication device 100 and permitting the registration, the first management device 10A transmits first registration acceptance (Accept) to the wireless communication device 100 (Step S6).

Accordingly, the wireless communication device 100 is connected with the first network 20A, and enters a communication range (Registered state) of the communication through the first network 20A. On the other hand, the wireless communication device 100 is not connected with the second network 20B, and is located outside the communication range (Deregistered state) of the communication through the second network 20B.

Subsequently, a case where the first and second MNOs have the roaming agreement will be described with reference to FIG. 3. Note that the processes up to Step S4 are the same as those in FIG. 2, and therefore, the descriptions will be omitted.

In the case where the first and second MNOs have the roaming agreement, the first PLMN list 40 includes the second PLMN ID (PLMN_21), as illustrated in FIG. 3. In this case, the wireless communication device 100 makes a second registration (registration) request to the first management device 10A, which belongs to the HPLMN (Step S7). Specifically, the wireless communication device 100 makes (transmits) a second registration request including information related to the second PLMN (for example, "PLMN_21", which is the second PLMN_ID) to the first management device 10A.

The first management device 10A that has received the second registration request registers the wireless communication device 100. In addition, the first management device 10A notifies the second management device 10B, which belongs to the second PLMN included in the second registration request, of the registration of the wireless communication device 100 (Step S8).

Accordingly, the first management device 10A is capable of communicating with the UE 1, and in addition, the second management device 10B is capable of communicating with the UE 1 through the first network 20A, for example.

The first management device 10A transmits, to the UE 1, second registration acceptance (Accept) for permitting the registration (Step S9).

Accordingly, the wireless communication device 100 is connected with the first network 20A, and is located within the communication range of the communication through the first network 20A. Furthermore, the wireless communication device 100 is also connected with the second network 20B through the first network 20A, and is also located within the communication range of the second network 20B.

<2.3. Outline of Monitoring Process>

Figure 4:
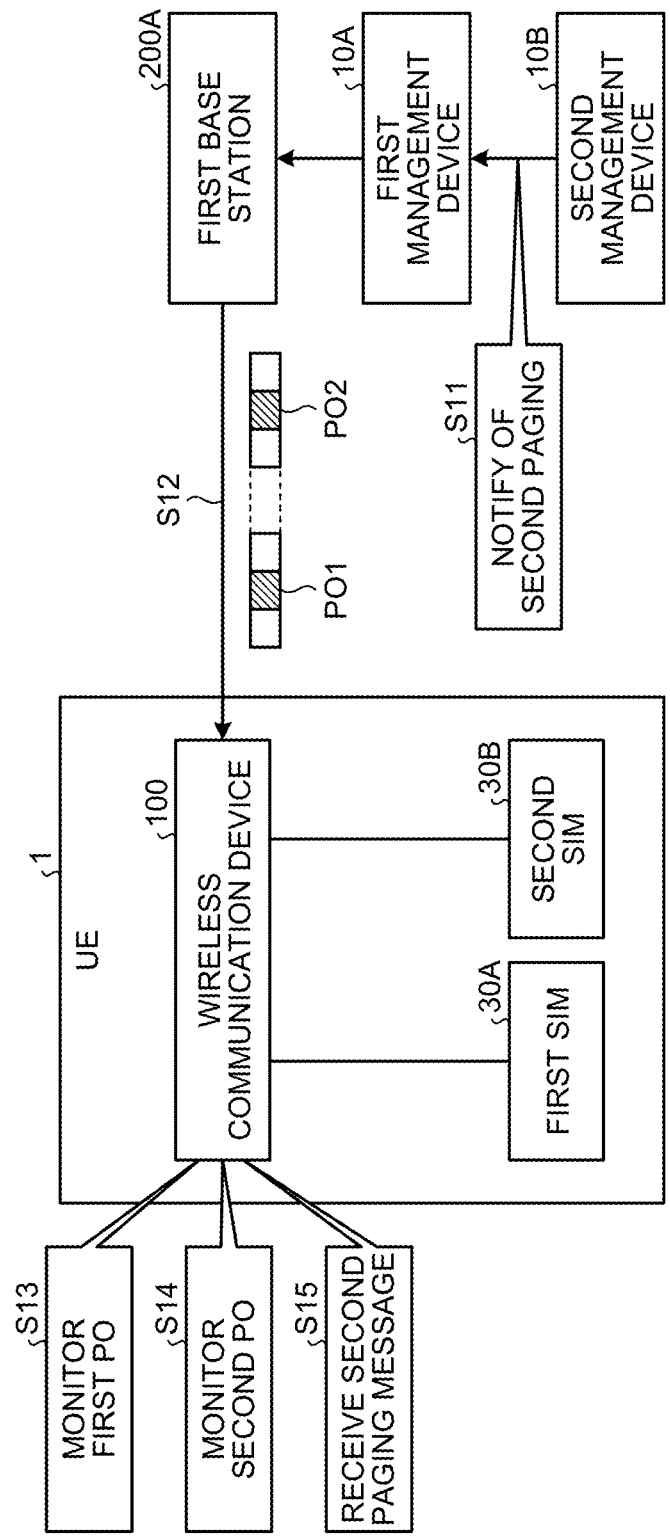
FIG. 4 is a diagram illustrating an example of a monitoring process according to an embodiment of the present disclosure.

Next, an outline of a paging monitoring process according to an embodiment of the present disclosure will be described with reference to FIG. 4. FIG. 4 is a diagram illustrating an example of the monitoring process according to an embodiment of the present disclosure.

Note that here, it is assumed that the first and second MNOs have, for example, the roaming agreement, and the wireless communication device 100 is capable of receiving a service provided by the second MNO through the first network 20A (the first management device 10A and the first base station 200A).

Specifically, the first management device 10A sets, as a home PLMN, the first PLMN ID stored in the first SIM 30A of the UE 1, and manages, as a visitor PLMN, the second PLMN ID stored in the second SIM 30B. Upon reception of information related to the service provided by the second MNO from the second management device 10B through the network N, the first management device 10A provides the wireless communication device 100 with the service via the first base station 200A.

As illustrated in FIG. 4, when a paging is generated in the second network 20B, the second management device 10B notifies the first management device 10A of the paging (also referred to as a second paging) (Step S11). The first management device 10A notifies the wireless communication device 100 of a paging message related to the second paging via the first base station 200A (Step S12).

Here, the paging message is arranged in a paging occasion PO of a paging frame PF, and is transmitted to the wireless communication device 100. In the paging process according to the present embodiment, the first base station 200A arranges a first paging message related to a first paging that has been generated in the first network 20A, in a first paging occasion PO1 of the paging frame PF, and transmits the first paging message. In addition, the first base station 200A arranges a second paging message related to the second paging that has been generated in the second network 20B, in a second paging occasion PO2 of the paging frame PF, and transmits the second paging message. The second paging occasion PO2 may be located in the same paging frame PF with the paging frame PF of the first paging occasion PO1, or may be located in a different paging frame PF.

Subsequently, the wireless communication device 100 determines the location of the first paging occasion PO1, based on an identifier of the wireless communication device 100 and system information reported from the first base station 200A, and monitors the first paging occasion PO1 (Step S13). Similarly, the wireless communication device 100 determines the location of the second paging occasion PO2, based on the identifier of the wireless communication device 100 and the system information reported from the first base station 200A, and monitors the second paging occasion PO2 (Step S14). Here, the first base station 200A arranges the second paging message in the second paging occasion PO2, and transmits the second paging message. Therefore, the wireless communication device 100 receives the second paging message (Step S15).

Accordingly, the wireless communication device 100 is capable of receiving the second paging that has been generated in the second network 20B through the first network 20A, based on the second paging message that has been received.

Note that in the following embodiments, in order to simplify the description, a case where the NR technology is used as a radio access technology will be described, and a case where LTE is used and a case where LTE and NR are used together will be described collectively as an application example in FIG. 23 and subsequent drawings.

<3. Configuration of Communication System>
<3.1. Configuration Example of Network Architecture>

Figure 5:
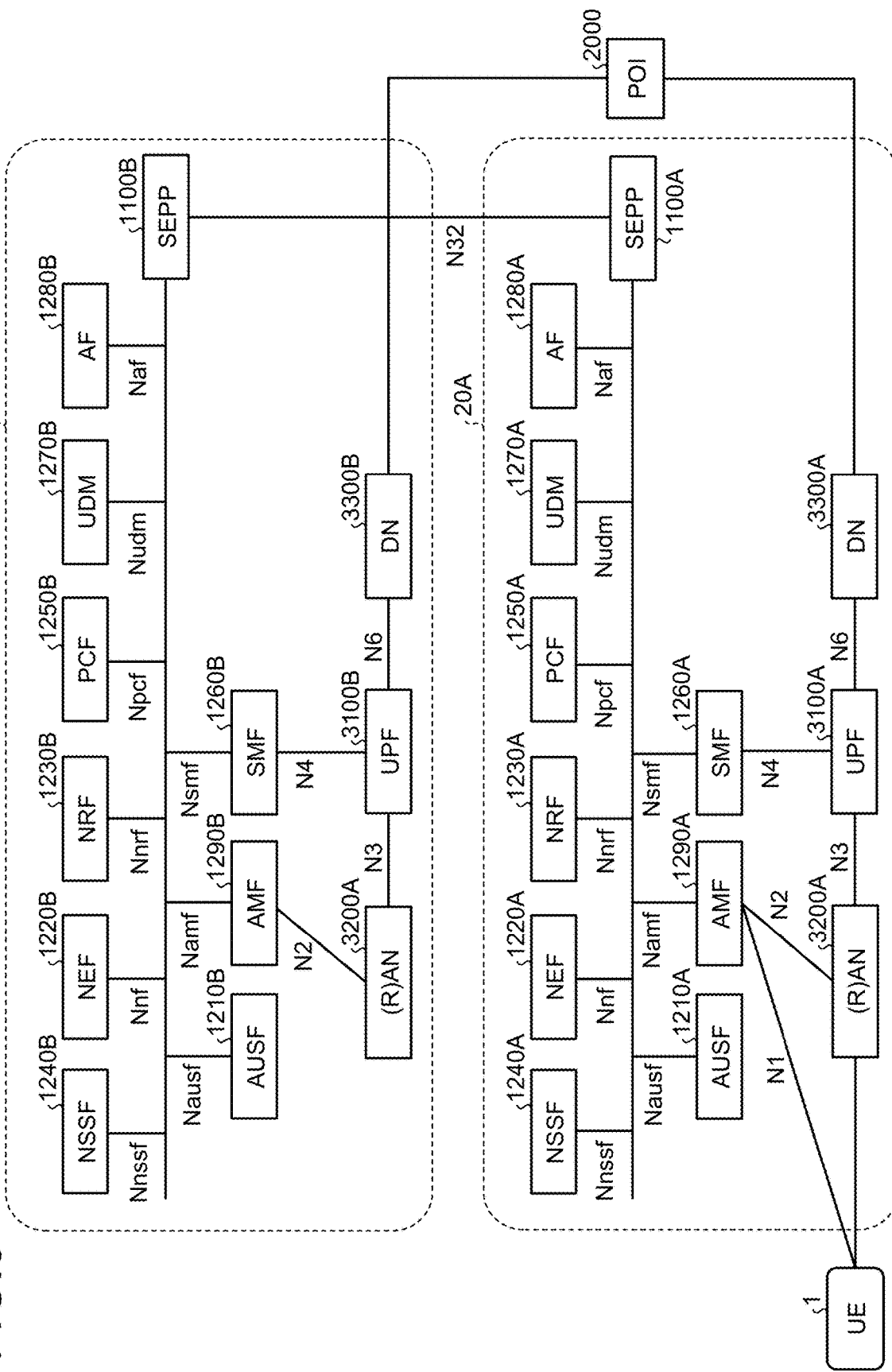
FIG. 5 is a diagram illustrating an example of a network architecture configuration according to an embodiment of the present disclosure.

Next, an outline of a configuration of a network architecture of NR will be described with reference to FIG. 5. FIG. 5 is a diagram illustrating an example of a network architecture configuration according to an embodiment of the present disclosure.

The network architecture illustrated in FIG. 5 includes the UE 1, and the first and second networks 20A and 20B. In FIG. 5, the UE 1 is connected with the first network 20A, but the UE 1 is also connectable with the second network 20B.

Control planes of the first and second networks 20A and 20B are connected with each other at a reference point N32 via security edge protection proxies (SEPPs) 1100A and 1100B. In addition, a user plane is connected via a point of interface (POI) 2000.

A function group of the control planes includes an authentication server function (AUSF) 1210, a network exposure function (NEF) 1220, a network repository function (NRF) 1230, a network slice selection function (NSSF) 1240, a policy control function (PCF) 1250, a session management function (SMF) 1260, a unified data management (UDM) 1270, an application function (AF) 1280, and an AMF 1290. The UDM 1270 includes a unified data repository (UDR) that holds and manages subscriber information, and a front end (FE) unit that processes the subscriber information. In addition, the AMF 1290 conducts mobility management, and the SMF 1260 conducts session management. A device that achieves the function of the AMF 1290 is the management device 10 in FIG. 1.

In addition, a user plane function (UPF) 3100 has a function of a user plane process. The management device 10 may have a function as the UPF 3100. A (R)AN 3200 has a function of enabling a connection with a radio access network (RAN) and a connection with an access network (AN) other than the RAN. The (R)AN 3200 includes a base station device that is called a gNB or an ng-eNB. A data network (DN) 3300 has a function of enabling a connection with a unique service of the MNO, the Internet, and a service of a third party.

3.2. Configuration Example of Management Device

Figure 6:
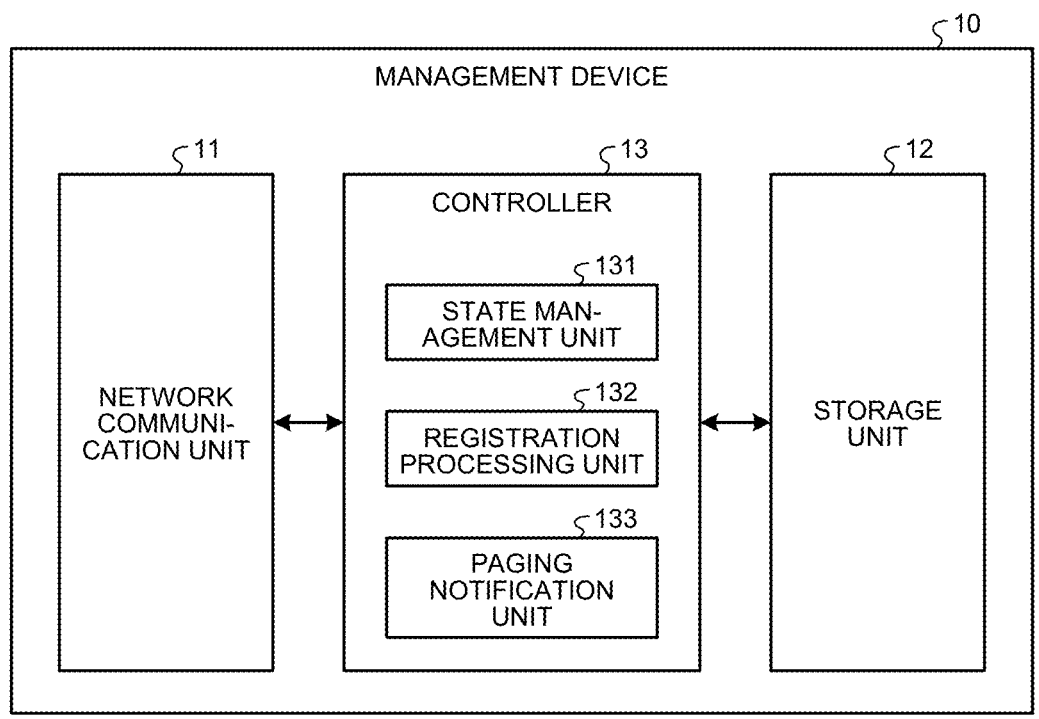
FIG. 6 is a diagram illustrating a configuration example of a management device according to an embodiment of the present disclosure.

Subsequently, a configuration of the first management device 10A according to an embodiment of the present disclosure will be described with reference to FIG. 6. FIG. 6 is a diagram illustrating a configuration example of the first management device 10A according to an embodiment of the present disclosure. Note that here, the configuration of the first management device 10A will be described, but the configuration of the second management device 10B is similar.

The first management device 10A includes a network communication unit 11, a storage unit 12, and a controller 13, and achieves the function of the AMF 1290 (see FIG. 5). Note that the configuration illustrated in FIG. 6 is a functional configuration, and a hardware configuration may be different from the functional configuration. In addition, the function of the first management device 10A may be implemented in a distributed manner in a plurality of physically separated configurations. For example, the first management device 10A may include a plurality of server devices.

The network communication unit 11 is a communication interface for communicating with another device. The network communication unit 11 may be a network interface or a device connection interface. The network communication unit 11 has a function of directly or indirectly connecting with an optional communication function NF (network function) of a core network.

For example, the network communication unit 11 may be provided with a local area network (LAN) interface such as a network interface card (NIC), or may be provided with a USB interface including a universal serial bus (USB) host controller, a USB port, and the like. Further, the network communication unit 11 may be a wired interface or a wireless interface.

The network communication unit 11 functions as a communication unit of the first management device 10A. The network communication unit 11 communicates with the UE 1, another management device, and the communication function NF (network function) in accordance with the control of the controller 13. In a 5G architecture, a service-based architecture is adopted, and the NFs are connected with each other through a uniform interface called a service-based interface.

The storage unit 12 is a data readable and writable storage device, such as a dynamic random access memory (DRAM), a static random access memory (SRAM), a flash memory, or a hard disk. The storage unit 12 functions as a storage unit of the first management device 10A. The storage unit 12 stores, for example, a state in registration management (RM) of the UE 1. The storage unit 12 may function as a home memory that stores location information of the UE 1.

The controller 13 is a controller (controller) that controls each unit of the first management device 10A. The controller 13 is achieved by, for example, a processor such as a central processing unit (CPU) or a micro processing unit (MPU). For example, the controller 13 is achieved by a processor executing various programs stored in the storage device inside the first management device 10A, with a random access memory (RAM) or the like used as a work area. Note that the controller 13 may be achieved by an integrated circuit, such as an application specific integrated circuit (ASIC) or a field programmable gate array (FPGA). Any of the CPU, the MPU, the ASIC, and the FPGA can be regarded as the controller.

As illustrated in FIG. 6, the controller 13 includes a state management unit 131, a registration processing unit 132, and a paging notification unit 133, and achieves or performs functions and actions of the communication process, such as a registration process and a paging notification process to be described below. Note that the internal structure of the controller 13 is not limited to the configuration illustrated in FIG. 6, and may be another configuration as long as the controller 13 performs the communication process to be described later. Further, the connection relationship between the processing units included in the controller 13 is not limited to the connection relationship illustrated in FIG. 6, and may be another connection relationship.

Figure 7:
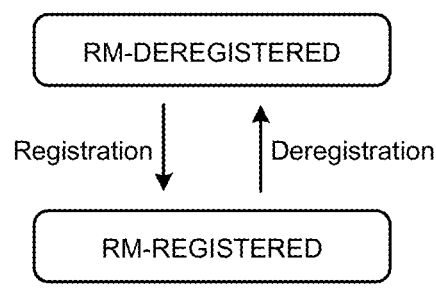
FIG. 7 is a state transition diagram illustrating a registration state of UE.

The state management unit 131 manages a state transition in the RM of the UE 1. Here, the state transition in the RM of the UE 1 will be described with reference to FIG. 7. FIG. 7 is a state transition diagram illustrating a registration state of the UE 1.

In FIG. 7, RM-REGISTERED indicates a state in which the UE 1 (or the wireless communication device 100) is registered, and RM-DEREGISTERED indicates a state in which the UE 1 is not registered (non-registered). That is, the state transition in the RM of the UE 1 depends on whether the UE 1 is registered with 5G core (5GC)/next generation core (NGC).

When the UE 1 is powered on and is registered with the first management device 10A, the state management unit 131 causes the state of the UE 1 to transition from RM-DEREGISTERED to RM-REGISTERED.

When the UE 1 is powered off or the UE 1 is located outside the range, the first management device 10A deletes the registration of the UE 1, and the state management unit 131 causes the state of the UE 1 to transition from RM-REGISTERED to RM-DEREGISTERED.

Alternatively, when the first management device 10A receives the Registration request from the UE 1 (or when the first management device 10A transmits the Registration Accept to the UE 1), the state management unit 131 causes the state of the UE 1 to transition from RM-DEREGISTERED to RM-REGISTERED. In addition, when the first management device 10A receives the Deregistration request from the UE 1 (or when the first management device 10A transmits Deregistration Accept to the UE 1), the state management unit 131 causes the state of the UE 1 to transition from RM-REGISTERED to RM-DEREGISTERED.

Figure 8:
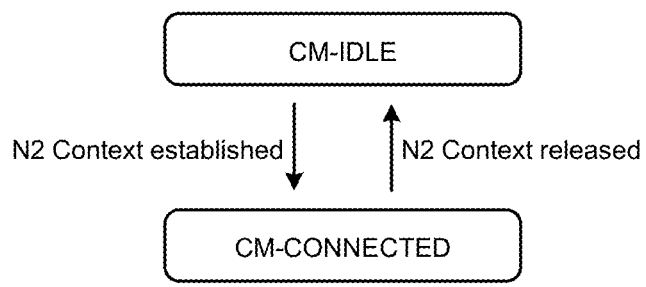
FIG. 8 is a state transition diagram illustrating a state in CM of the UE.

Further, the state management unit 131 manages a state transition in connection management (CM) of the UE 1. Here, the state transition in the CM of the UE 1 will be described with reference to FIG. 8. FIG. 8 is a state transition diagram illustrating a state in the CM of the UE 1.

In FIG. 8, CM-CONNECTED indicates a state in which the UE 1 (or the wireless communication device 100) has a NAS signalling connection, and CM-IDLE indicates a state in which the UE 1 does not have the NAS signalling connection. That is, the state transition in the CM of the UE 1 depends on whether the UE 1 has the NAS signalling connection with the AMF 1290.

When an N2 Context is established in the first management device 10A, the state management unit 131 causes the state of the UE 1 to transition from CM-IDLE to CM-CONNECTED. When the N2 Context is released in the first management device 10A, the state management unit 131 causes the state of the UE 1 to transition from CM-CONNECTED to CM-IDLE. In addition, the UE 1 in the CM-CONNECTED state can be in an RRC-INACTIVE state.

Note that, for example, the state management unit 131 may manage, as the home PLMN, the first PLMN ID stored in the first SIM 30A, and may manage, as the visitor PLMN, the second PLMN ID stored in the second SIM 30B.

The registration processing unit 132 performs a registration process of the UE 1. Upon reception of the registration request from the UE 1, the registration processing unit 132 performs the registration process. Specifically, upon reception of the registration request from the UE 1, the registration processing unit 132 causes the state of the UE 1 managed by the state management unit 131 to transition to RM-REGISTERED. In addition, in a case where the second PLMN is included in the registration request from the UE 1, the registration processing unit 132 notifies the second management device 10B, which belongs to the second PLMN, of the registration of the UE 1.

Further, in a case where the first PLMN ID is managed as the visitor PLMN by the second management device 10B, the first management device 10A receives a registration notification of the UE 1 from the second management device 10B. In this case, for example, the registration processing unit 132 may manage the UE 1 as UE to be roamed in.

The paging notification unit 133 notifies the UE 1 of the first paging that has been generated in the first network 20A via the first base station 200A. In addition, upon reception of a notification about the second paging that has been generated in the second network 20B from the second management device 10B, the paging notification unit 133 notifies the UE 1 of the second paging via the first base station 200A.

In addition, it is assumed that in a case where the first PLMN ID is managed as the visitor PLMN by the second management device 10B, the first paging addressed to the UE 1 is generated in the first network 20A. In this case, the paging notification unit 133 notifies the second management device 10B of the first paging. Accordingly, the second management device 10B is capable of notifying the UE 1 of the first paging via the second base station 200B.

3.3. Configuration Example of Base Station

Figure 9:
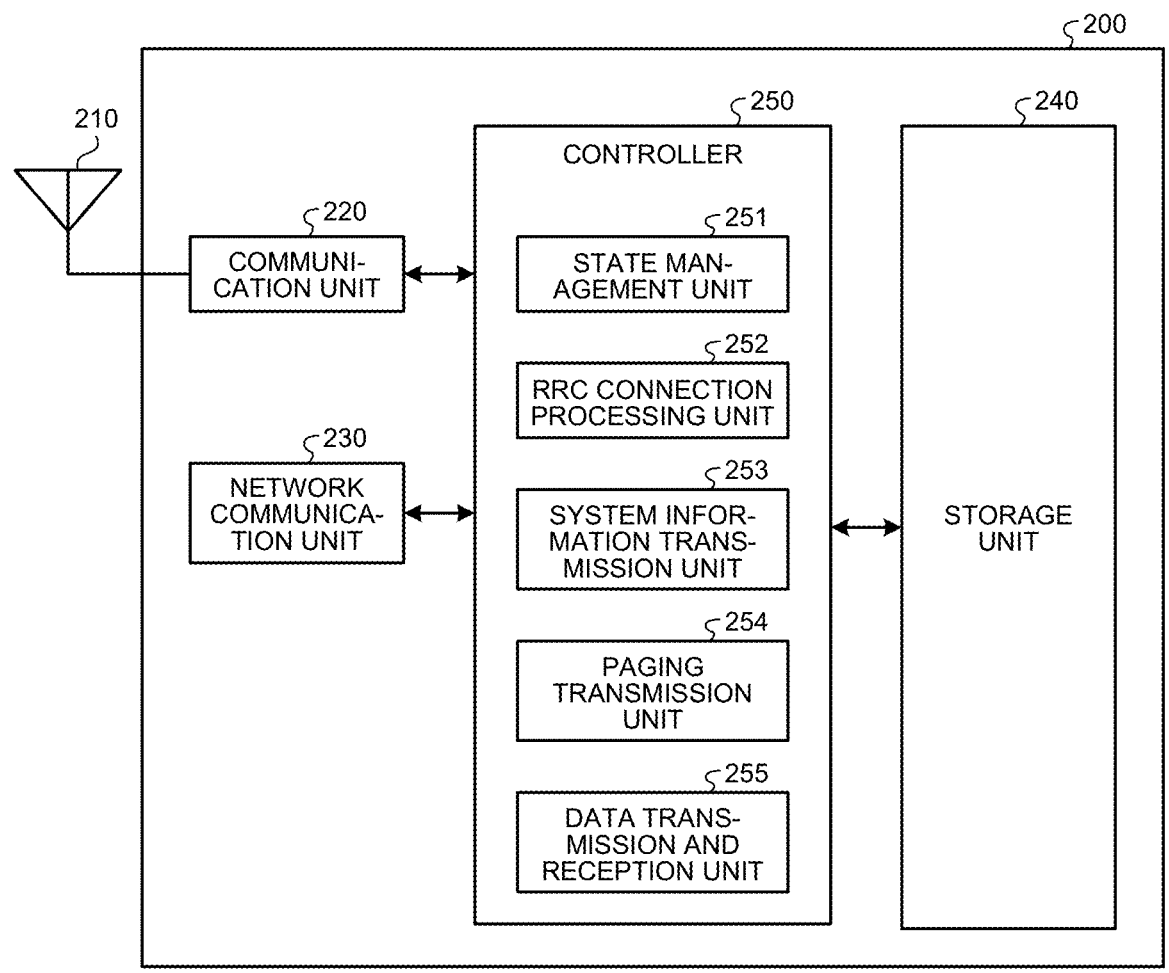
FIG. 9 is a diagram illustrating a configuration example of a base station according to an embodiment of the present disclosure.

FIG. 9 is a diagram illustrating a configuration example of the base station 200 according to an embodiment of the present disclosure. The base station 200 includes an antenna unit 210, a communication unit 220, a network communication unit 230, a storage unit 240, and a controller 250.

The antenna unit 210 spatially emits, as radio waves, signals output from the communication unit 220. Further, the antenna unit 210 converts the radio waves in space into signals, and outputs the signals to the communication unit 220.

The communication unit 220 wirelessly transmits and receives signals. For example, the communication unit 220 receives an uplink signal from the wireless communication device 100, and transmits a downlink signal to the wireless communication device 100.

The network communication unit 230 is a communication interface for communicating with another device. The network communication unit 230 may be a network interface or a device connection interface. The network communication unit 230 has a function of directly or indirectly connecting with a core network.

For example, the network communication unit 230 may be provided with a local area network (LAN) interface such as a network interface card (NIC), or may be provided with a USB interface configured with a universal serial bus (USB) host controller, a USB port, or the like. Further, the network communication unit 230 may be a wired interface or a wireless interface.

The network communication unit 230 functions as a communication unit of the base station 200. The network communication unit 230 communicates with another base station, the management device 10, and a communication function NF (network function) in accordance with the control of the controller 250. In a 5G architecture, a service-based architecture is adopted, and the NFs are connected with each other through a uniform interface called a service-based interface.

The storage unit 240 is a data readable and writable storage device, such as a dynamic random access memory (DRAM), a static random access memory (SRAM), a flash memory, or a hard disk. The storage unit 240 functions as a storage unit of the base station 200. The storage unit 240 stores, for example, the state of 240 of the UE 1.

The controller 250 is a controller that controls each unit of the base station 200. The controller 250 is achieved by, for example, a processor such as a central processing unit (CPU) or a micro processing unit (MPU). For example, the controller 250 is achieved by a processor executing various programs stored in a storage device inside the base station 200, with a random access memory (RAM) or the like used as a work area. Note that the controller 250 may be achieved by an integrated circuit, such as an application specific integrated circuit (ASIC) or a field programmable gate array (FPGA). Any of the CPU, the MPU, the ASIC, and the FPGA can be regarded as the controller.

As illustrated in FIG. 9, the controller 250 includes a state management unit 251, an RRC connection processing unit 252, a system information transmission unit 253, a paging transmission unit 254, and a data transmission and reception unit 255, and achieves or performs functions and actions of a communication process, such as a registration process and a paging notification process to be described below. Note that the internal structure of the controller 250 is not limited to the configuration illustrated in FIG. 9, and may be another configuration as long as the controller 250 performs the communication process to be described later. Further, the connection relationship between the processing units included in the controller 250 is not limited to the connection relationship illustrated in FIG. 9, and may be another connection relationship.

Figure 10:
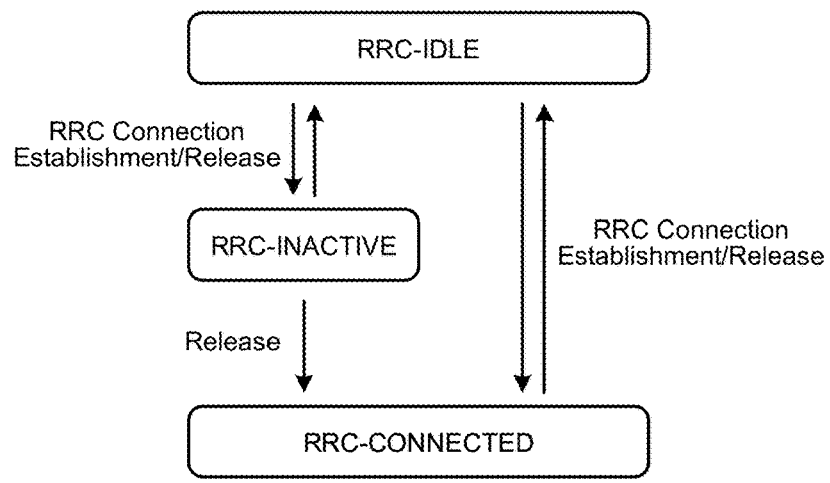
FIG. 10 is a state transition diagram illustrating a registration state of the UE.

The state management unit 251 manages a state transition in RRC of the UE 1. Here, the state transition in the RRC of the UE 1 will be described with reference to FIG. 10. FIG. 10 is a state transition diagram illustrating a registration state of the UE 1.

The state transition in the RRC depends on whether the UE 1 is in an active state or in a standby state from the viewpoint of an access stratum (AS) protocol. That is, in a case where the UE 1 is in the active state, the state management unit 251 manages the UE 1 as RRC-CONNECTED. This state is a state transitioned from RRC-IDLE with a setup of RRC connection as a trigger, or from RRC_Inactive with Resume of RRC connection as a trigger. With the setup of the RRC connection as the trigger, the UE 1 recognizes the current cell as a Primary Cell (PCell). The UE 1 conducts communication using a control message on a signaling radio bearer (SRB) in the PCell that has been allocated.

On the other hand, when the UE 1 is in the standby state, the state management unit 251 manages the UE 1 as RRC-IDLE. In the case of this state, the radio access network (RAN) does not grasp the UE 1. In addition, the SRB is released. In RRC-IDLE, the UE 1 starts some limited communications (for example, reception of System information). For example, upon reception of a Paging request, the RAN connects with the UE 1 by using an RRC Paging Message. Note that details of the paging process will be described later.

In addition, in a case where a connection is made from the UE 1 to the RAN or in a case of responding to the Paging Message, the UE 1 performs an RRC Connection Establishment process (for example, a Random Access procedure and an RRC (Connection) Setup procedure). In response to such a process, when the RAN accepts the establishment of the RRC Connection, the state management unit 251 causes the state of the UE 1 to transition to RRC-CONNECTED as described above.

Note that in LTE and NR, in addition to an RRC-IDLE state and an RRC-CONNECTED state, the RRC-INACTIVE state is defined as a state management in the RRC as illustrated in FIG. 10. In the RRC-INACTIVE state, RRC and a non access stratum (NAS) contexts are held in the wireless communication device 100, the base station 200, and the core network.

The RRC connection processing unit 252 performs an RRC connection process of the UE 1. The RRC connection processing unit 252 performs the RRC connection process, when receiving a notification related to the RRC connection establishment process from the UE 1. Specifically, when accepting the establishment of the RRC connection of the UE 1, the RRC connection processing unit 252 causes the state of the UE 1 managed by the state management unit 251 to transition to RRC-CONNECTED.

The system information transmission unit 253 reports the system information to the UE 1. The system information is information for reporting settings in a cell through which the system information is transmitted. The system information includes, for example, information related to an access to the cell, information related to a cell selection, information related to another radio access technology (RAT) or another system, and the like.

The system information can be classified into a master information block (MIB) and a system information block (SIB). The MIB is information of a fixed payload size to be reported by a PBCH. The MIB includes information for acquiring the SIB. The SIB is system information other than the MIB. The SIB is reported by a PDSCH.

For example, the MIB in NR is report information necessary for receiving the system information, and includes a part of a system frame number, information of at least an SIB 1 and a Msg.2/4 for an initial connection and information of a subcarrier interval of pagings and a broadcast SI messages, information of a subcarrier offset, information of a DMRS type A position, PDCCH settings for at least the SIB 1, information of cell prohibition (cell barred), information of intra-frequency reselection, and the like. Note that the MIB in LTE may also include some or all pieces of the information described above.

In addition, the SIB 1 in NR includes information related to a cell selection, information related to a cell access, information related to connection establishment failure control, scheduling information of system information other than the SIB 1, settings of a serving cell, and the like. The settings of the serving cell include a cell-specific parameter, and include downlink settings, uplink settings, TDD setting information, and the like. The uplink settings include an RACH setting and the like. Note that the SIB 1 in LTE may also include some or all pieces of the information described above.

The paging transmission unit 254 transmits a paging message to the wireless communication device 100 present in a cell of the base station 200. The paging transmission unit 254 transmits the paging message, by using a paging occasion PO of the paging frame PF. Details of PF and PO will be described later with reference to FIGS. 17 to 22.

The data transmission and reception unit 255 transmits and receives user data to and from the wireless communication device 100 present in a cell of the base station 200. The data transmission and reception unit 255 transmits downstream user data to the wireless communication device 100. In addition, the data transmission and reception unit 255 receives upstream user data from the wireless communication device 100.

3.4. Configuration Example of Wireless Communication Device

Figure 11:
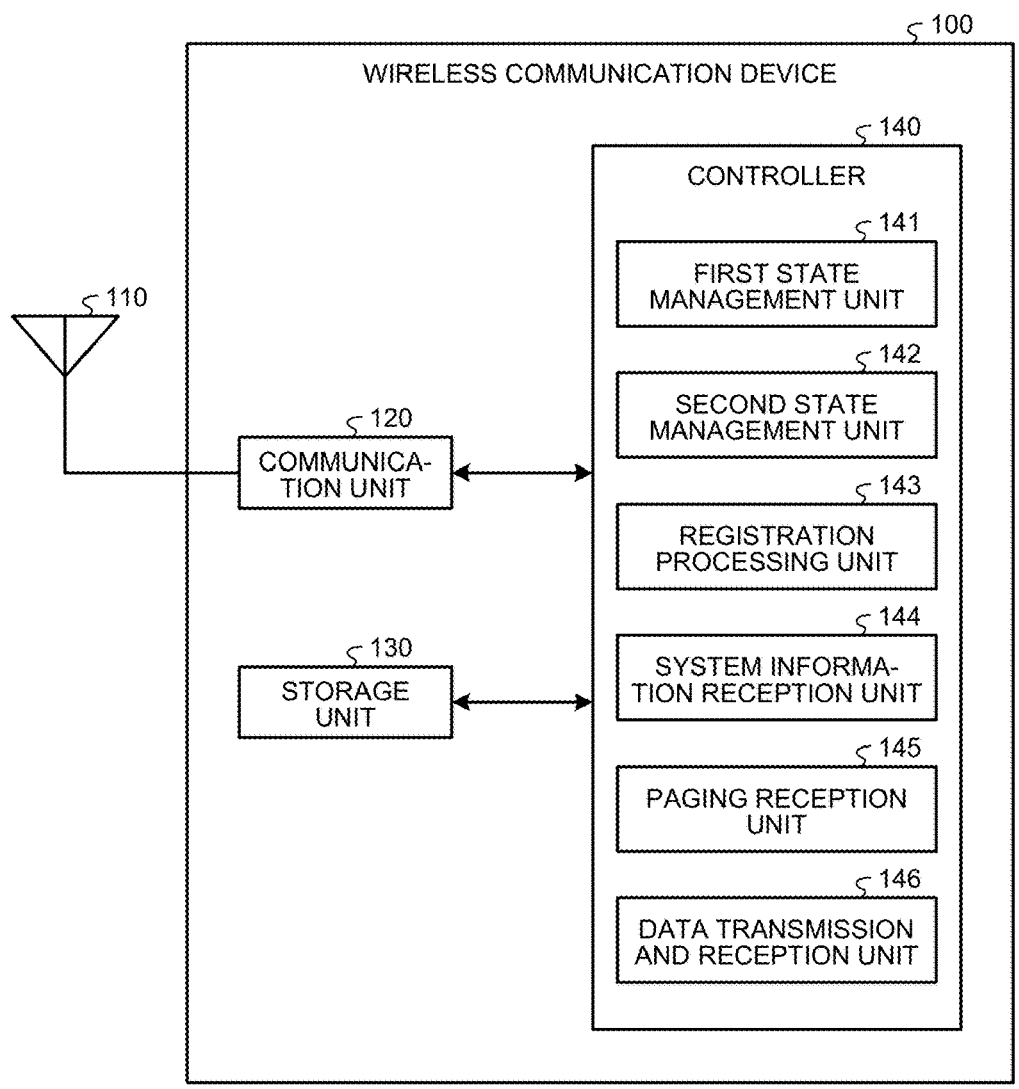
FIG. 11 is a diagram illustrating a configuration example of a wireless communication device according to an embodiment of the present disclosure.

FIG. 11 is a diagram illustrating a configuration example of the wireless communication device 100 according to an embodiment of the present disclosure. As illustrated in FIG. 11, the wireless communication device 100 includes an antenna unit 110, a communication unit 120, a storage unit 130, and a controller 140.

The antenna unit 110 spatially emits, as radio waves, signals output from the communication unit 120. In addition, the antenna unit 110 converts the radio waves in space into signals, and outputs the signals to the communication unit 120.

The communication unit 120 wirelessly transmits and receives signals. For example, the communication unit 120 receives a downlink signal from the base station 200, and transmits an uplink signal to the base station 200. In addition, the communication unit 120 receives NAS signalling from the management device 10 via the base station 200, and transmits the NAS signalling to the management device 10.

The storage unit 130 is a data readable and writable storage device, such as a dynamic random access memory (DRAM), a static random access memory (SRAM), a flash memory, or a hard disk. The storage unit 130 functions as a storage unit of the wireless communication device 100. The storage unit 130 temporarily or permanently stores various programs and various types of data for the operation of the wireless communication device 100.

The controller 140 is a controller that controls each unit of the wireless communication device 100. The controller 140 is achieved by, for example, a processor such as a central processing unit (CPU) or a micro processing unit (MPU). For example, the controller 140 is achieved by a processor executing various programs stored in the storage device in the wireless communication device 100, with a random access memory (RAM) or the like used as a work area. Note that the controller 140 may be achieved by an integrated circuit, such as an application specific integrated circuit (ASIC) or a field programmable gate array (FPGA). Any of the CPU, the MPU, the ASIC, and the FPGA can be regarded as the controller.

As illustrated in FIG. 11, the controller 140 includes a first state management unit 141, a second state management unit 142, a registration processing unit 143, a system information reception unit 144, a paging reception unit 145, and a data transmission and reception unit 146. The respective units of the controller 140 achieve or perform functions and actions of the communication process, such as a registration process to be described below. Note that the internal structure of the controller 140 is not limited to the configuration illustrated in FIG. 11, and may be another configuration as long as the controller 140 performs the communication process to be described later. Further, the connection relationship between the respective processing units included in the controller 140 is not limited to the connection relationship illustrated in FIG. 11, and may be another connection relationship.

Figure 12:
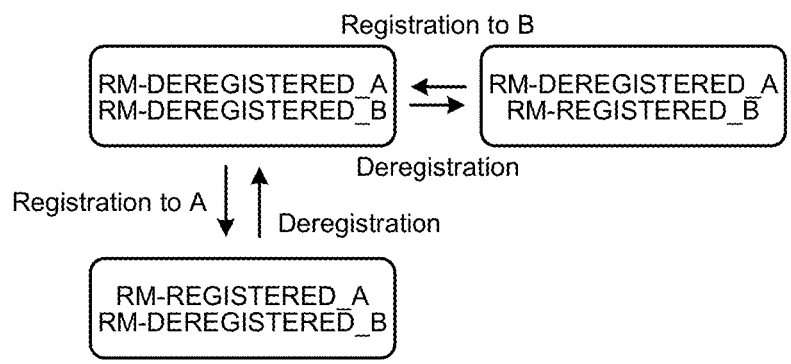
FIG. 12 is a diagram for describing an example of a state transition of the UE.

The first state management unit 141 manages a state transition in the RM of the UE 1. Here, the state transition in the RM of the UE 1 will be described with reference to FIG. 12. FIG. 12 is a diagram for describing an example of the state transition of the UE 1. The first state management unit 141 manages, as the states of the UE 1, a registration state (RM-REGISTERED) that is registered with the management device 10 and a non-registration state (RM-DEREGISTERED) that is not registered, for every PLMN.

The first state management unit 141 manages both the first PLMN and the second PLMN as the non-registration state (RM-DEREGISTERED_A, RM-DEREGISTERED_A), in a case where the UE 1 (or the wireless communication device 100) is not registered with either of the first or second management device 10A or 10B, for example, at the time of powering on.

Here, it is assumed that the registration processing unit 143 performs a registration process for the first management device 10A. In this case, the first state management unit 141 manages the first PLMN as the registration state (RM-REGISTERED_A) and the second PLMN as the non-registration state (RM-DEREGISTERED_A).

On the other hand, when the registration processing unit 143 requests the first management device 10A for registration deletion of the UE 1 in the state of "RM-REGISTERED_A, RM-DEREGISTERED_B", the first state management unit 141 manages both the first and second PLMNs as the non-registration state (RM-DEREGISTERED_A, RM-DEREGISTERED_B).

Note that here, the first state management unit 141 does not manage whether the wireless communication device 100 is in a state of being capable of using a service of the second network 20B through the first network 20A (hereinafter, also referred to as a roaming state). For example, the first state management unit 141 may separately manage a home PLMN registration state (for example, RM-REGISTERED) and a visitor PLMN registration state (for example, RM- REGISTERED-R) so as to manage whether the wireless communication device 100 is in the roaming state.

Figure 13:
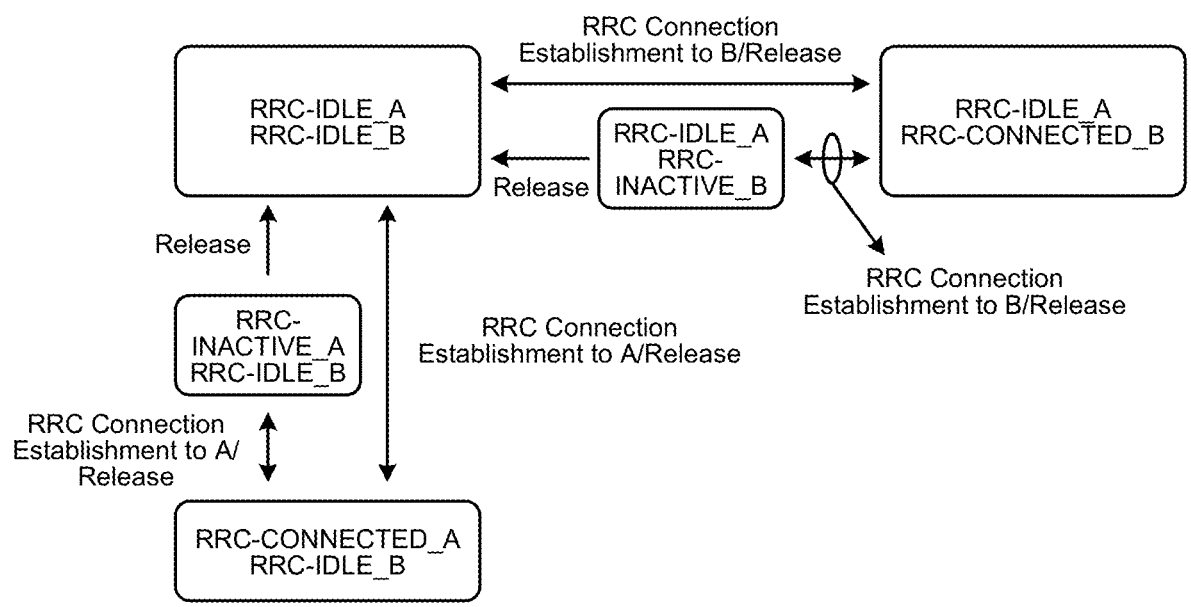
FIG. 13 is a diagram for describing an example of the state transition of the UE.

The second state management unit 142 manages the state transition in the RRC of the UE 1. Here, the state transition in the RRC of the UE 1 will be described with reference to FIG. 13. FIG. 13 is a diagram for describing an example of the state transition of the UE 1. The second state management unit 142 manages, as the state of the UE 1, RRC-CONNECTED, RRC-INACTIVE, and RRC-IDLE, for every PLMN.

For example, in a case where both the first and second PLMNs are RRC-IDLE (RRC-IDLE_A, RRC-IDLE_B), it is assumed that the registration processing unit 143 performs an RRC connection establishment process on a RAN connected with the first network 20A. In this case, the second state management unit 142 causes the first PLMN to transition to RRC-CONNECTED_A (maintains the second PLMN in an RRC-IDLE_B state).

On the other hand, when the registration processing unit 143 performs an RRC connection release process on the RAN connected with the first network 20A in the state of "RRC-CONNECTED_A, RRC-IDLE_B", the second state management unit 142 causes the first PLMN to transition to RRC-IDLE (RRC-IDLE_A) (maintains the second PLMN in the RRC-IDLE_B state).

Note that as described above, in LTE and NR, the RRC-INACTIVE state is defined, in addition to the RRC-IDLE state and the RRC-CONNECTED state, in the RRC state management. In the RRC-INACTIVE state, RRC and non access stratum (NAS) contexts are held in the wireless communication device 100, the base station 200, and a core network.

The registration processing unit 143 performs the registration process for the management device 10. Such a registration process includes first and second registration processes. The first registration process is a registration request process for one PLMN. In addition, the second registration process includes a registration request to one PLMN and a roaming registration request to the other PLMN. Note that details of the registration process performed by the registration processing unit 143 will be described later with reference to FIGS. 14 to 16.

In addition, the registration processing unit 143 performs an RRC connection process for the base station 200. The registration processing unit 143 performs an RRC connection establishment process/an RRC connection release process, and switches the state of RRC with respect to the base station 200 among RRC-CONNECTED/RRC-INACTIVE/RRC-IDLE.

The system information reception unit 144 acquires system information reported from the base station 200. The system information reception unit 144 receives, for example, the MIB and the SIB 1 from the base station 200.

The paging reception unit 145 receives a paging message transmitted from the base station 200. Specifically, the paging reception unit 145 monitors the paging occasion PO of the paging frame PF, and receives the paging message. Note that details of the paging frame PF and the paging occasion PO will be described later with reference to FIGS. 17 to 22.

Note that the paging reception unit 145 does not have to continuously monitor the paging channel at all times. The paging reception unit 145 may monitor a paging channel in accordance with, for example, a paging discontinuous reception (DRX) cycle set by the network.

The data transmission and reception unit 146 transmits and receives user data to and from the base station 200. The data transmission and reception unit 146 transmits the uplink user data to the base station 200. In addition, the data transmission and reception unit 146 receives the downlink user data from the base station 200.

Heretofore, the description has been given with regard to the functional configuration examples of the management device 10, the base station 200, and the wireless communication device 100 according to embodiments of the present disclosure. Subsequently, an operation example of the communication system according to an embodiment of the present disclosure will be described.

<4. Operation of Communication System>

First, as an operation of the communication system, the registration process performed by the wireless communication device 100 will be described, and then a paging monitoring process performed by the wireless communication device 100 will be described.

<4.1. Registration selection process>

First, a registration selection process performed by the wireless communication device 100 will be described with reference to FIGS. 14 and 15 prior to the description of the registration process. As described above, the registration process includes the first registration process that is a registration request process for one PLMN and the second registration process that is a registration request process for two PLMNs including the roaming registration. The wireless communication device 100 performs the registration selection process so as to select either the first or second registration process.

An example of the registration selection process will be described with reference to FIG. 14. FIG. 14 is a flowchart illustrating an example of the registration selection process according to an embodiment of the present disclosure. The registration selection process is performed with, for example, powering on the wireless communication device 100, an instruction from the user, or the like, as a trigger.

Figure 14:
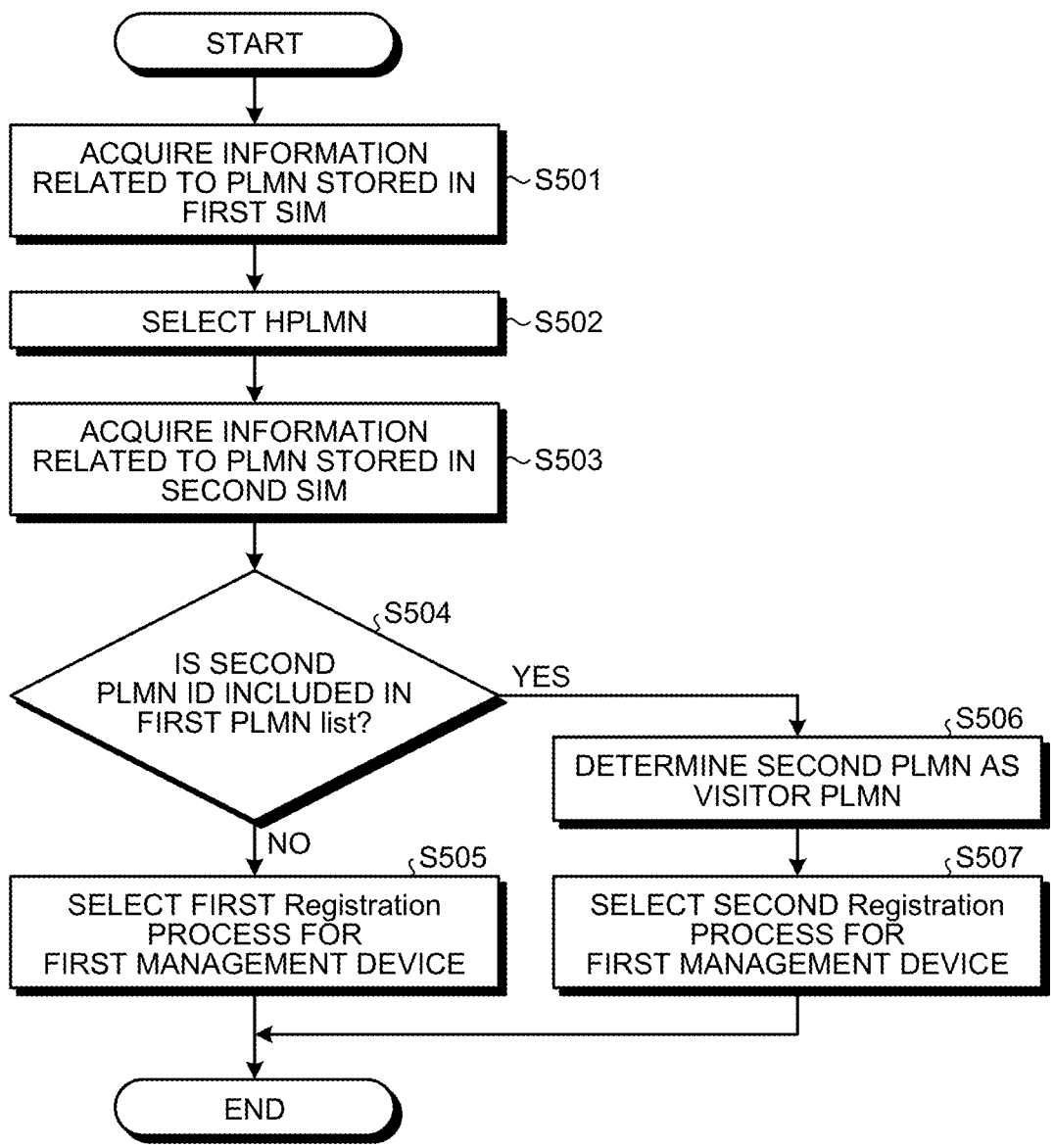
FIG. 14 is a flowchart illustrating an example of a registration selection process according to an embodiment of the present disclosure.
Figure 15:
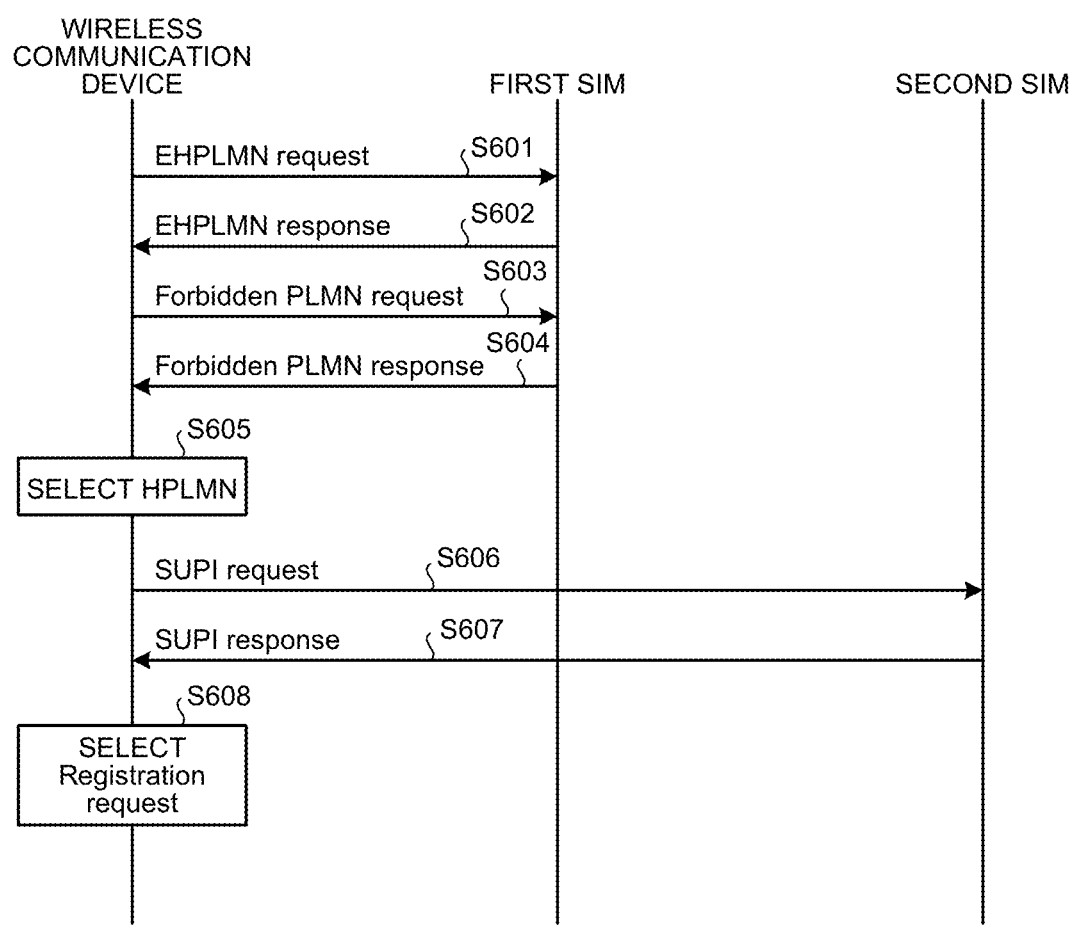
FIG. 15 is a sequence diagram for describing the registration selection process.

As illustrated in FIG. 14, the registration processing unit 143 of the wireless communication device 100 acquires information related to the PLMN stored in the first SIM 30A (Step S501). For example, the registration processing unit 143 acquires the first PLMN list 40.

Subsequently, the registration processing unit 143 selects an HPLMN from the first PLMN list 40 (Step S502). Next, the registration processing unit 143 acquires information related to the PLMN stored in the second SIM 30B (Step S503). The registration processing unit 143 acquires a second PLMN ID from, for example, the second SIM 30B.

The registration processing unit 143 determines whether the second PLMN ID is included in the first PLMN list 40 (Step S504). In a case where the second PLMN ID is not included in the first PLMN list 40 (Step S504; No), the registration processing unit 143 selects the first registration process for the first management device 10A, which belongs to the HPLMN (Step S505).

On the other hand, in a case where the second PLMN ID is included in the first PLMN list 40 (Step S504; Yes), the registration processing unit 143 determines the second PLMN as a visitor PLMN (Step S506), and selects the second registration process for the first management device 10A (Step S507).

<4.2. Details of registration selection process>

Details of the registration selection process including communication with the SIM 30 will be described with reference to FIG. 15. FIG. 15 is a sequence diagram for describing the registration selection process.

The wireless communication device 100 (hereinafter, also referred to as mobile equipment (ME) 100) performs a USIM initialization procedure. More specifically, the ME 100 transmits an equivalent home PLMN (EHPLMN) request to acquire information in an elementary file_EHPLMN (EF_EHPLMN) in the first SIM 30A (USIM) (Step S601). In response to this, the first SIM 30A transmits an EHPLMN response (Step S602). Accordingly, the wireless communication device 100 acquires an EHPLMN list from the first SIM 30A.

Next, the wireless communication device 100 transmits a Forbidden PLMN request so as to acquire information in the EF_FPLMN in the first SIM 30A (USIM) (Step S603). In response to this, the first SIM 30A transmits a Forbidden PLMN response (Step S604). Accordingly, the wireless communication device 100 acquires a Forbidden PLMN list that is a non-selectable PLMN.

The wireless communication device 100 selects the HPLMN from the first PLMN list 40 in which the Forbidden PLMN is excluded from the EHPLMN list (Step S605). The wireless communication device 100 selects, as the HPLMN, a PLMN that is available and that has a higher priority, based on order of priority (Priority) from among PLMN candidates that are included in, for example, the EHPLMN list and that are not included in the Forbidden PLMN list.

Here, in a case where the EHPLMN list does not exist, or the EHPLMN list is empty, the wireless communication device 100 may request the first SIM 30A to transmit a subscriber permanent identifier (SUPI). In this case, the wireless communication device 100 selects the HPLMN included in the SUPI, to which the first SIM 30A responds. At this time, the wireless communication device 100 may transmit an HPLMN selector with Access Technology request to the first SIM 30A, and may confirm an access technology (for example, 5G(NR) or 4G(EUTRA)) supported by the HPLMN that has been acquired from the SUPI from information acquired as a result of the response.

In addition, the wireless communication device 100 may transmit an Operator controlled PLMN Selector with Access Technology request and a User Controlled PLMN Selector with Access Technology request to the first SIM 30A, in addition to the EHPLMN request. In this case, the wireless communication device 100 may select an HPLMN from the first PLMN list 40 included in a response from the first SIM 30A. Note that it is sufficient if the wireless communication device 100 transmits, to the first SIM 30A, at least one of the EHPLMN request, the Operator controlled PLMN Selector with Access Technology request, and the User Controlled PLMN Selector with Access Technology request, and it is not always necessary to transmit all of them.

Subsequently, the wireless communication device 100 requests the SUPI as the second PLMN ID from the second SIM 30B (Step S606). In response to this, the second SIM 30B transmits a SUPI response (Step S607). Accordingly, the wireless communication device 100 acquires the second PLMN ID.

Note that here, the wireless communication device 100 acquires the second PLMN ID, without limitation to this. The wireless communication device 100 may acquire a second PLMN list including a plurality of second PLMN IDs. In this case, the wireless communication device 100 may acquire the second PLMN list based on the EHPLMN list and the Forbidden PLMN list that are stored in the second SIM 30B, similarly to the first PLMN list 40.

The wireless communication device 100 determines whether the second PLMN ID is included in the first PLMN list 40, and selects a Registration request to be transmitted to the first management device 10A (Step S608).

Note that when acquiring the second PLMN list from the second SIM 30B, the wireless communication device 100 determines whether all the second PLMN candidates included in the second PLMN list are included in the first PLMN list 40. In a case where all the second PLMN candidates are not included in the first PLMN list 40, the wireless communication device 100 determines performing the first registration process.

On the other hand, in a case where at least one of the second PLMN candidates is included in the first PLMN list 40, the wireless communication device 100 determines performing the second registration process. At this time, in a case where there is one second PLMN candidate included in the first PLMN list 40, the wireless communication device 100 determines such one second PLMN candidate as the second PLMN to be included in the second Registration. In a case where there are a plurality of second PLMN candidates included in the first PLMN list 40, the wireless communication device 100 determines a second PLMN candidate having a high priority order as the second PLMN to be included in the second Registration.

<4.3. Registration Process>

Subsequently, the registration process performed by the wireless communication device 100 will be described. As described above, the registration process includes the first registration process that is a registration request process for one PLMN and the second registration process that is a registration request process for two PLMNs including the roaming registration.

Figure 16:
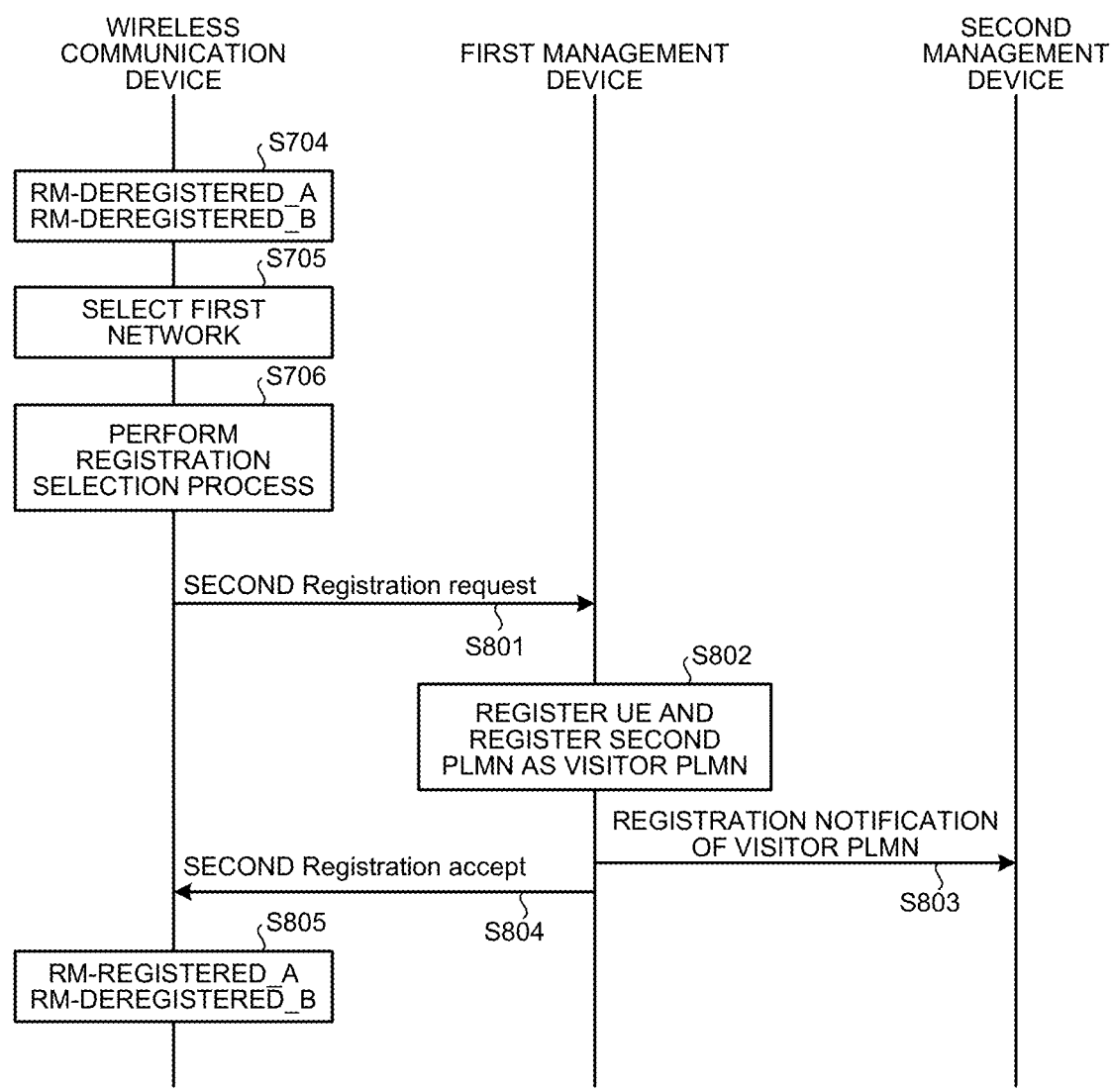
FIG. 16 is a sequence diagram for describing an example of a second registration process.

The first registration process is the same process with the registration process by the UE 1 equipped with one SIM, and therefore the description is omitted here. Hereinafter, as the registration process performed by the registration processing unit 143 of the wireless communication device 100, a description will be given with regard to the second registration process of making a request to the first management device 10A to conduct registration with the first PLMN and a roaming registration request with the second PLMN with reference to FIG. 16. FIG. 16 is a sequence diagram for describing an example of the second registration process. Note that the second registration process is selected, in a case where the second PLMN ID is included in the first PLMN list 40.

The wireless communication device 100, in a state of not being registered with the first or second PLMN (RM-DEREGISTERED_A, RM-DEREGISTERED_B) (Step S704), selects a network to be connected with (Step S705). Here, the first network 20A is selected. Note that it is assumed that the network to be connected with is selected, based on, for example, a previous connection destination, an instruction from the user or the management device 10, or the like.

The wireless communication device 100 performs the registration selection process with the first PLMN as a registration destination (Step S706). The wireless communication device 100 that has selected the second registration process in the registration selection process of Step S706 transmits a second Registration request to the first management device 10A (Step S801). The second Registration request includes the second PLMN ID. Here, the second Registration request may include an SUCI generated from the SUPI stored in the second SIM 30B, instead of the second PLMN ID or together with the second PLMN ID.

Here, in a case where 5G-GUTI that has been allocated from the first PLMN, to which the first management device 10A belongs, is available, the wireless communication device 100 includes 5G-GUTI in the second Registration request, and transmits the second Registration request. On the other hand, in a case where 5G-GUTI that has been allocated is not available, the wireless communication device 100 includes 5G-GUTI that has been allocated from another PLMN (for example, the second PLMN, to which the second management device 10B belongs) in the second Registration request, and transmits the second Registration request.

Note that in a case where the wireless communication device 100 does not have 5G-GUTI that is available, the wireless communication device 100 includes the SUCI generated from the SUPI stored in the first SIM 30A in the second Registration request, and transmits the second Registration request.

Further, the wireless communication device 100 may include information related to a paging priority in the second Registration request. Here, the information related to the paging priority is information indicating priorities of the first paging addressed to the SUPI stored in the first SIM 30A and the second paging addressed to the SUPI stored in the second SIM 30B. In a case where the timings of the first paging and the second paging overlap with each other, the first management device 10A gives priority to one of the pagings, based on such information. In a case where such information is not included in the second Registration request, the first management device 10A may give priority to the first paging addressed to the SUPI stored in the first SIM 30A managed for the home PLMN.

Subsequently, the first management device 10A that has received the second Registration request registers the UE 1, and also registers the second PLMN ID as the visitor PLMN (Step S802).

Here, in a case where the first management device 10A does not acquire a permanent equipment identifier (PEI), which is identification information of the UE 1 (UE identity), the first management device transmits an Identity Request to the wireless communication device 100 to acquire the PEI of the UE 1. The PEI is, for example, IMEI. Note that the first management device 10A may acquire the SUCI, instead of the PEI.

The first management device 10A notifies the second management device 10B, which belongs to the second PLMN, that the second PLMN has been registered as the visitor PLMN (Step S803). In addition, the first management device 10A transmits a second Registration accept to the wireless communication device 100 to notify that the registration of the UE 1 has been completed (Step S804).

The wireless communication device 100 causes the first PLMN to transition to the registration state (RM-REGISTERED_A) and the second PLMN to transition to the non-registration (RM-DEREGISTERED_B) state (Step S805), and ends the second registration process. Here, the wireless communication device 100 may receive a notification indicating that the second PLMN is registered as the visitor PLMN via the second Registration accept message, and may cause the first PLMN to transition to the home PLMN registration state (RM-REGISTERED_A) and the second PLMN to transition to the visitor PLMN registration state (RM-REGISTERED_R_B).

In this manner, the wireless communication device 100 is registered with the first PLMN, so that the first management device 10A and the first base station 200A notifies an update of the system information, and an earthquake and tsunami warning system (ETWS)/a commercial mobile alert service (CMAS) indication through the first PLMN.

<4.4. Paging Monitoring Process>

In addition, the wireless communication device 100 performs a monitoring process of monitoring the paging on the network of the first PLMN. Note that the paging to be monitored differs depending on the state of the wireless communication device 100. Therefore, first, types of paging will be briefly described. Then, the paging frame PF and the monitoring process will be described.

<4.4.1. Types of Paging>

First, the paging to be monitored by the wireless communication device 100 will be described. There are following three types of paging.

(1) Core network (CN)-initiated paging in which a DRX cycle of default is reported by the system information
(2) CN-initiated paging in which the DRX cycle is reported by the system information via NAS signalling
(3) Radio access network (RAN)-initiated paging in which the DRX cycle is reported by the system information via RRC signalling Here, the wireless communication device 100 in the RRC-IDLE state monitors paging having a shorter DRX cycle of the CN-initiated pagings (1) and (2). In addition, the wireless communication device 100 in the RRC-INACTIVE state monitors the paging having the shortest DRX cycle of the pagings (1) to (3). The wireless communication device 100 in the RRC-CONNECTED state monitors the paging channel in all the paging occasions PO notified by the system information.

Note that the paging occasion PO for each wireless communication device 100 for the CN-initiated paging and the radio access network (RAN)-initiated paging is set, based on an identical terminal identifier (UE ID). For this reason, the timing of the paging occasion PO of the CN-initiated paging and the timing of the paging occasion PO of the radio access network (RAN)-initiated paging overlap with each other.

Subsequently, the paging monitoring process by the wireless communication device 100 will be described. The monitoring process differs depending on which one of the first and second registration processes described above is registered with the PLMN. Therefore, the monitoring process will be described for each registration process.

<4.4.2. Case of Registration in First Registration Process>

First, a case where the wireless communication device 100 performs the first registration process, and is connected with one PLMN will be described. Here, first, the paging frame PF and the paging occasion PO transmitted by the base station 200 will be described, and a monitoring process by the wireless communication device 100 will be described.

The paging frame PF and the paging occasion PO are determined, based on the following formulas specified in 3GPP TS 38.304.

A system frame number (SFN) of the paging frame PF is determined by $(SFN+PF\_offset) \mod T = (T \div N)*(UE\_ID \mod N)$ (formula 1). Here, T is a DRX cycle of the wireless communication device 100. PF_offset is an offset value used for determining the paging frame PF. N is the number of all paging frames PF in T. Note that the values of N and PF_offset are acquired from an nAndPagingFrameOffset parameter.

Further, UE_ID is determined by

UE_ID=5G-S-TMSI mod 1024 (formula 2). Here, 5G-S-TMSI (temporary mobile subscription identifier) is a form of an identifier acquired by shortening a 5G-GUTI (globally unique temporary identifier) to enable more efficient wireless signaling during, for example, a paging or a service request.

Index (i_s) for notifying an index value of the paging occasion PO is determined by i_s=floor(UE ID/N)mod Ns (formula 3). Here, Ns is the number of the paging occasions PO for the paging frame PF. Note that initial values of Ns, nAndPagingFrameOffset, and the DRX cycle of the parameters are notified in SystemInformationBlock1.

(Monitoring Process)

Figure 17:
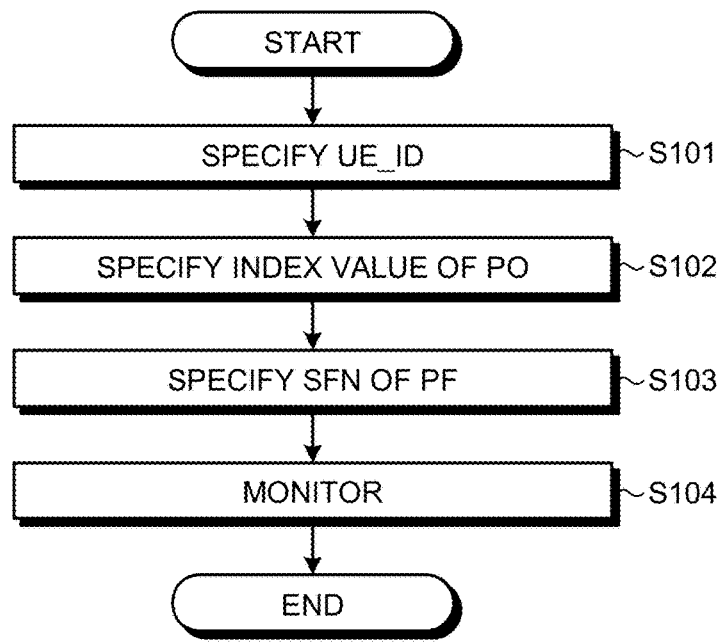
FIG. 17 is a flowchart for describing a monitoring process according to an embodiment of the present disclosure.

Next, the monitoring process by the wireless communication device 100 will be described with reference to FIG. 17. FIG. 17 is a flowchart for describing the monitoring process according to an embodiment of the present disclosure.

As illustrated in FIG. 17, the wireless communication device 100 specifies UE ID, by using, for example, 5G-S-TMSI corresponding to 5G-GUTI that has been allocated from the registered PLMN and (formula 2) (Step S101). Next, the wireless communication device 100 specifies the index value of the paging occasion PO based on (formula 3) (Step S102).

The wireless communication device 100 specifies the SFN of the paging frame PF, by using the UE ID identified in Step S101 and (formula 1) (Step S103). The wireless communication device 100 monitors the paging addressed to the self-device in the DRX cycle, based on the SFN of the paging frame PF that has been specified and the index value of the paging occasion PO (Step S104).

Note that in a case where the wireless communication device 100 does not have the 5G-S-TMSI, for example, before registration with the PLMN, the wireless communication device 100 uses an identifier "0" as an initial value of UE ID at the time of deriving the paging frame PF and i_s.

<4.4.3. Case of Registration in Second Registration Process>

A description will be given with regard to a case where the wireless communication device 100 has performed the second registration process, and has registered, for example, the first PLMN as the home PLMN and the second PLMN as the visitor PLMN.

It is conceivable that the paging frame PF and the paging occasion PO in this case have several variations. Therefore, hereinafter, the monitoring process of the wireless communication device 100 for each variation of the plurality of paging frames PF will be described.

4.4.3.1. First Example of Paging Frame PF

Figure 18:
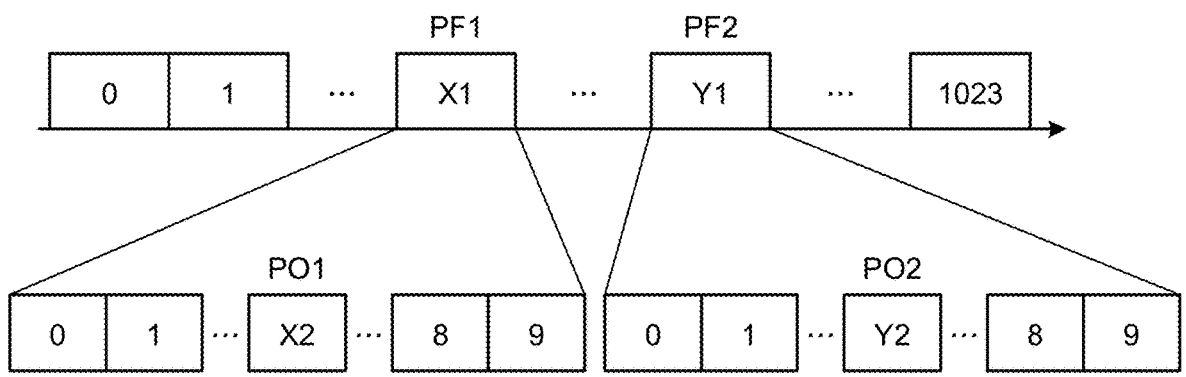
FIG. 18 is a diagram for describing a first example of a paging frame PF.

FIG. 18 is a diagram for describing a first example of the paging frame PF. In this case, a paging frame PF1 for delivering a first paging message and a paging frame PF2 for delivering a second paging message are different from each other.

Here, it is assumed that the base station 200 sets, for example, $SFN_{MAX}$ (In FIG. 18, $SFN_{MAX}$=1024) radio frames as one unit, sets a system frame number (SFN) of 0 to $SFN_{MAX}$−1 to the radio frame, allocates radio resources, and communicates with the wireless communication device 100. In this situation, the base station 200 allocates a predetermined frame of the radio frames to the paging frame PF. For example, in FIG. 18, SFN=X1 is allocated to the paging frame PF1 (hereinafter, also referred to as a first paging frame PF1) for delivering the first paging, and SFN=Y1 is allocated to the paging frame PF2 (hereinafter, also referred to as a second paging frame PF2) for delivering the second paging.

Further, the paging frame PF includes, for example, ten subframes. The base station 200 sets an index value (a subframe number) of 0 to 9 in a subframe of the paging frame PF, and communicates with the wireless communication device 100.

In this situation, the base station 200 allocates a predetermined subframe of the first paging frame PF1 to the first paging occasion PO1, and allocates a predetermined subframe of the second paging frame PF2 to the second paging occasion PO2. In FIG. 18, the base station 200 allocates a subframe having an index value "X2" to the first paging occasion PO1, and allocates a subframe having an index value "Y2" to the second paging occasion PO2.

Note that the base station 200 determines the SFNs of the first and second paging frames PF1 and PF2 and the index values of the first and second paging occasions PO1 and PO2, by using, for example, the above-described (formula 1) to (formula 3) and 5G-S-TMSI allocated from each of the first and second PLMNs. Accordingly, the base station 200 is capable of allocating respectively different paging frames PF to the first paging message and the second paging message.

(Monitoring Process)

Figure 19:
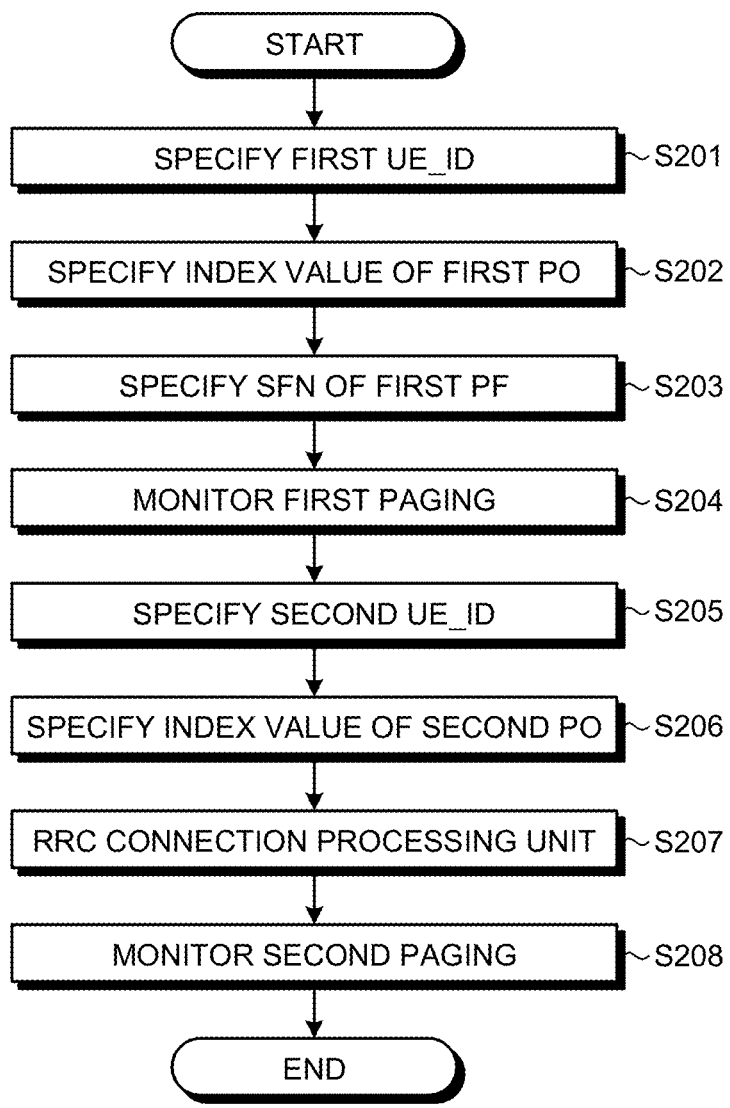
FIG. 19 is a flowchart illustrating an example of the monitoring process according to an embodiment of the present disclosure.

Subsequently, a monitoring process of the wireless communication device 100 in a case where the paging frame illustrated in FIG. 18 is used will be described with reference to FIG. 19. FIG. 19 is a flowchart illustrating an example of the monitoring process according to an embodiment of the present disclosure.

As illustrated in FIG. 19, the wireless communication device 100 specifies a first UE_ID, by using the 5G-S-TMSI that has been allocated from the first PLMN, which is, for example, the home PLMN and (formula 2) (Step S201). Next, the wireless communication device 100 acquires values of N and PF_offset, by using parameters related to Ns, nAndPagingFrameOffset, and the initial value of the DRX cycle acquired via the SystemInformationBlock 1. The wireless communication device 100 specifies the index value of the first paging occasion PO1, based on these acquired values and (formula 3) (Step S202).

The wireless communication device 100 specifies the SFN of the first paging frame PF1, by using the first UE_ID identified in Step S201 and (formula 1) (Step S203). The wireless communication device 100 monitors the first paging in the DRX cycle, based on the SFN of the first paging frame PF1 and the index value of the first paging occasion PO1 that have been specified (Step S204).

Subsequently, the wireless communication device 100 specifies a second UE_ID, by using the 5G-S-TMSI that has been allocated from the second PLMN, which is, for example, the visitor PLMN and (formula 2) (Step S205). Next, the wireless communication device 100 specifies the index value of the second paging occasion PO2, based on (formula 3) (Step S206).

The wireless communication device 100 specifies the SFN of the second paging frame PF2, by using the second UE ID specified in Step S205 and (formula 1) (Step S207). The wireless communication device 100 monitors the second paging in the DRX cycle, based on the SFN of the second paging frame PF2 and the index value of the second paging occasion PO2 that have been specified (Step S208).

In this manner, by setting the first paging occasion PO and the second paging occasion PO independently of each other, the wireless communication device 100 is capable of monitoring the first and second pagings independently of each other.

4.4.3.2. Second Example of Paging Frame PF

Figure 20:
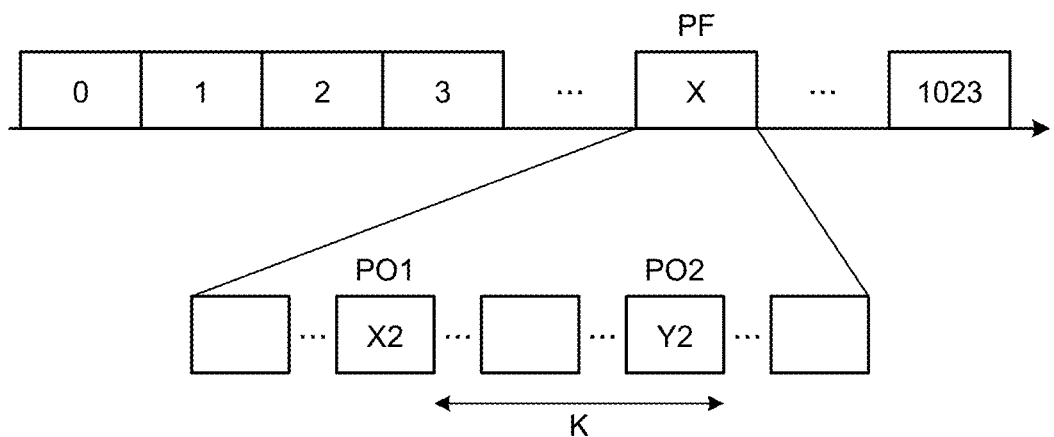
FIG. 20 is a diagram for describing a second example of the paging frame PF.

Subsequently, FIG. 20 is a diagram for describing a second example of the paging frame PF. Here, as illustrated in FIG. 20, the first paging occasion PO1 and the second paging occasion PO2 are arranged in the same paging frame PF.

As illustrated in FIG. 20, the first paging occasion PO1 is arranged in a sub frame having an index value "X2". In addition, the second paging occasion PO2 is arranged in a subframe having an index value "Y2 (=X2+K)" separated from the first paging occasion PO1 by K. In this manner, by arranging the second paging occasion PO2 relatively to the first paging occasion PO1, the first and second paging occasions PO1 and PO2 each can be arranged in one paging frame PF.

Note that a relative distance (an offset value) K between the first and second paging occasions PO1 and PO2 may be preset. Alternatively, the base station 200 may notify the wireless communication device 100 of a relative distance K, by using the system information.

As described above, in a case where the first and second paging occasions PO1 and PO2 are respectively arranged in different paging frames PF, it is necessary to wait for the first and second paging frames PF1 and PF2 to monitor each of the paging occasions PO1 and PO2. On the other hand, in a case where the first and second paging occasions PO1 and PO2 are arranged in one paging frame PF, it is sufficient only to wait for one paging frame PF, and a state in which the wireless communication device 100 is active can be shortened. Accordingly, an increase in electric power consumption of the wireless communication device 100 can be reduced.

(Monitoring Process)

Figure 21:
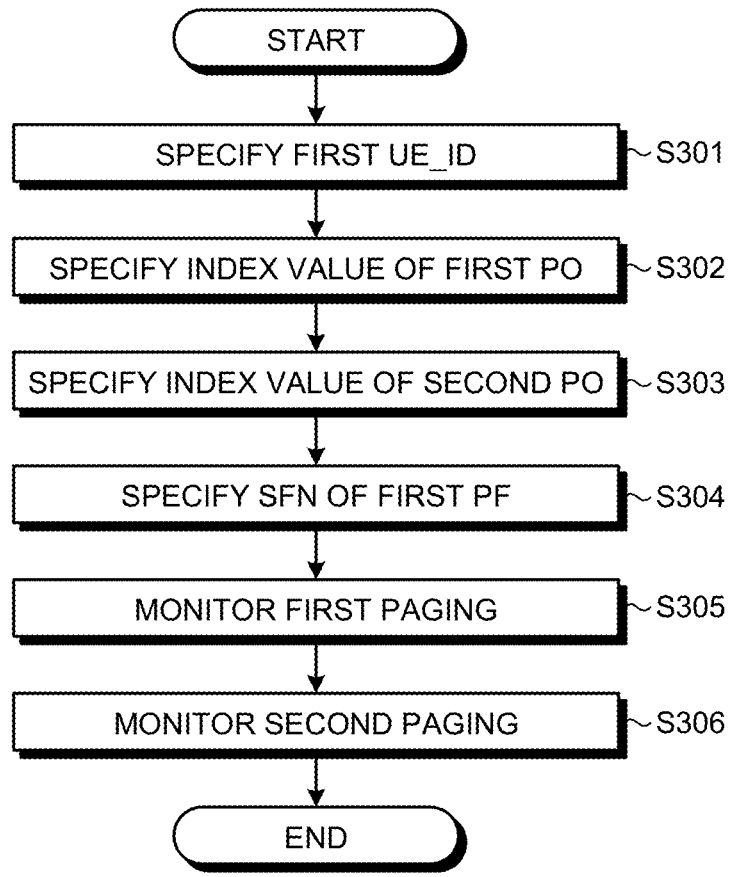
FIG. 21 is a flowchart illustrating an example of the monitoring process according to an embodiment of the present disclosure.

Subsequently, a monitoring process of the wireless communication device 100 in a case where the paging frame illustrated in FIG. 20 is used will be described with reference to FIG. 21. FIG. 21 is a flowchart illustrating an example of the monitoring process according to an embodiment of the present disclosure.

As illustrated in FIG. 21, the wireless communication device 100 specifies the first UE_ID, by using the 5G-S-TMSI that has been allocated from the first PLMN, which is, for example, the home PLMN and (formula 2) (Step S301). Next, the wireless communication device 100 acquires values of N and PF_offset, by using parameters related to Ns, nAndPagingFrameOffset, and the initial value of the DRX cycle acquired via the SystemInformationBlock 1. The wireless communication device 100 specifies the index value of the first paging occasion PO1, based on these acquired values and (formula 3) (Step S302). Subsequently, the wireless communication device 100 specifies the index value of the second paging occasion PO2, by using the index value of the first paging occasion PO1 that has been specified and the relative distance K (Step S303).

Subsequently, the wireless communication device 100 specifies the SFN of the first paging frame PF1, by using the first UE_ID and (formula 1) (Step S304). The wireless communication device 100 monitors the first and second pagings in the DRX cycle, based on the SFN of the first paging frame PF1 that has been specified and the index values of the first and second paging occasions PO1 and PO2 (Step S305, Step S306).

In this manner, by including a plurality of paging occasions PO in one paging frame PF, the wireless communication device 100 is capable of monitoring a plurality of pagings.

4.4.3.3. Third Example of Paging Frame PF

Figure 22:
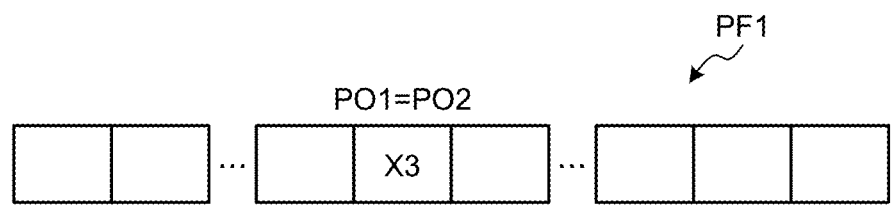
FIG. 22 is a diagram for describing a third example of the paging frame PF.

Subsequently, FIG. 22 is a diagram for describing a third example of the paging frame PF. Here, as illustrated in FIG. 22, in one paging occasion P0, the first paging and the second paging are notified. In other words, it can also be said that the first paging occasion PO1 and the second paging occasion PO2 are the same (PO1=PO2). Note that in FIG. 22, illustration of a plurality of radio frames is omitted, and a subframe of one paging frame PF (the first paging frame PF1 in FIG. 22) is illustrated.

In the example illustrated in FIG. 22, the base station 200 transmits the first paging message or the second paging message, by using one paging occasion of the first paging frame PF1. The first paging message is a message that notifies a paging addressed to the first PLMN. The second paging message is a message that notifies a paging addressed to the second PLMN.

The wireless communication device 100 monitors the paging occasion of the first paging frame PF1 so as to monitor the first and second pagings. The wireless communication device 100 determines whether the paging message is the first or second paging message, based on the UE Identity (for example, 5G-S-TMSI or IMSI) stored in a Paging Record of the paging message that has been acquired via the paging occasion.

Note that, for example, transmission timings of the first and second paging messages for notifying such first and second pagings overlap with each other in some cases, depending on the timings when the first and second pagings are generated. In this case, the base station 200, for example, firstly transmits the paging message with a higher priority, based on the priority (Paging Priority) of the paging message notified from the management device 10.

It is assumed that such a priority of the paging message is notified from the wireless communication device 100 to the management device 10, for example, at the time when the wireless communication device 100 performs the second registration process for the management device 10. In addition, it is assumed that such a priority of the paging message is, for example, included and notified in the paging message transmitted from the management device 10 to the base station 200.

Alternatively, the base station 200 may acquire priority information indicating which the first paging or the second paging a higher priority is given to, from the controller 140 of the wireless communication device 100 via the RRC signaling. The base station 200 first transmits a paging message having a higher priority, based on such information. Accordingly, the base station 200 is capable of transmitting the paging message in accordance with the priority without the intervention of the management device 10.

Alternatively, the base station 200 may determine the priority so that the higher priority is given to the first paging message that is a message addressed to the home PLMN than the second paging message that is a message addressed to the visitor PLMN.

Note that the monitoring process of one paging occasion PO is the same with the monitoring process illustrated in FIG. 17, and thus the description is omitted.

5. Application Example

5.1. Application Example in Relation to Radio Access Technology

The technology according to the present disclosure is applicable to other radio access technologies. For example, the communication system may adopt LTE as a radio access technology, or may adopt both LTE and NR.

5.1.1. Application Example to LTE

Configuration Example of Network Architecture

First, a case where the communication system according to the present disclosure adopts LTE will be described. FIG. 23 is a diagram illustrating an example of a network architecture configuration of LTE. The network architecture illustrated in FIG. 23 includes the UE 1, and first and second networks 20LA and 20LB. In FIG. 23, the UE 1 is connected with a first network 20LA, but the UE 1 is also connectable with a second network 20LB.

The first and second networks 20LA and 20LB are connected with each other through a point of interface (POI) 2000L.

The network 20L includes an eNB 3001, an MME 3002, a serving gateway (S-GW) 3003, a packet data network gateway (P-GW) 3004, and a home subscriber server (HSS) 3005.

The eNB 3001 functions as a base station of LTE. The MME 3002 is a control node that handles control plane signals, and manages a movement state of the terminal device. The S-GW 3003 is a control node that handles user plane signals, and is a gateway apparatus that switches a transfer path of user data. The P-GW 3004 is a control node that handles the user plane signals, and is a gateway apparatus serving as a connection point between the network 20L and the PDN 3000. The HSS 3005 is a control node that handles subscriber data, and conducts service control. The management device 10 is a device that achieves the function of the MME 3002. In addition, the management device 10 may have the function as the S-GW 3003 or the P-GW 3004.

Figure 23:
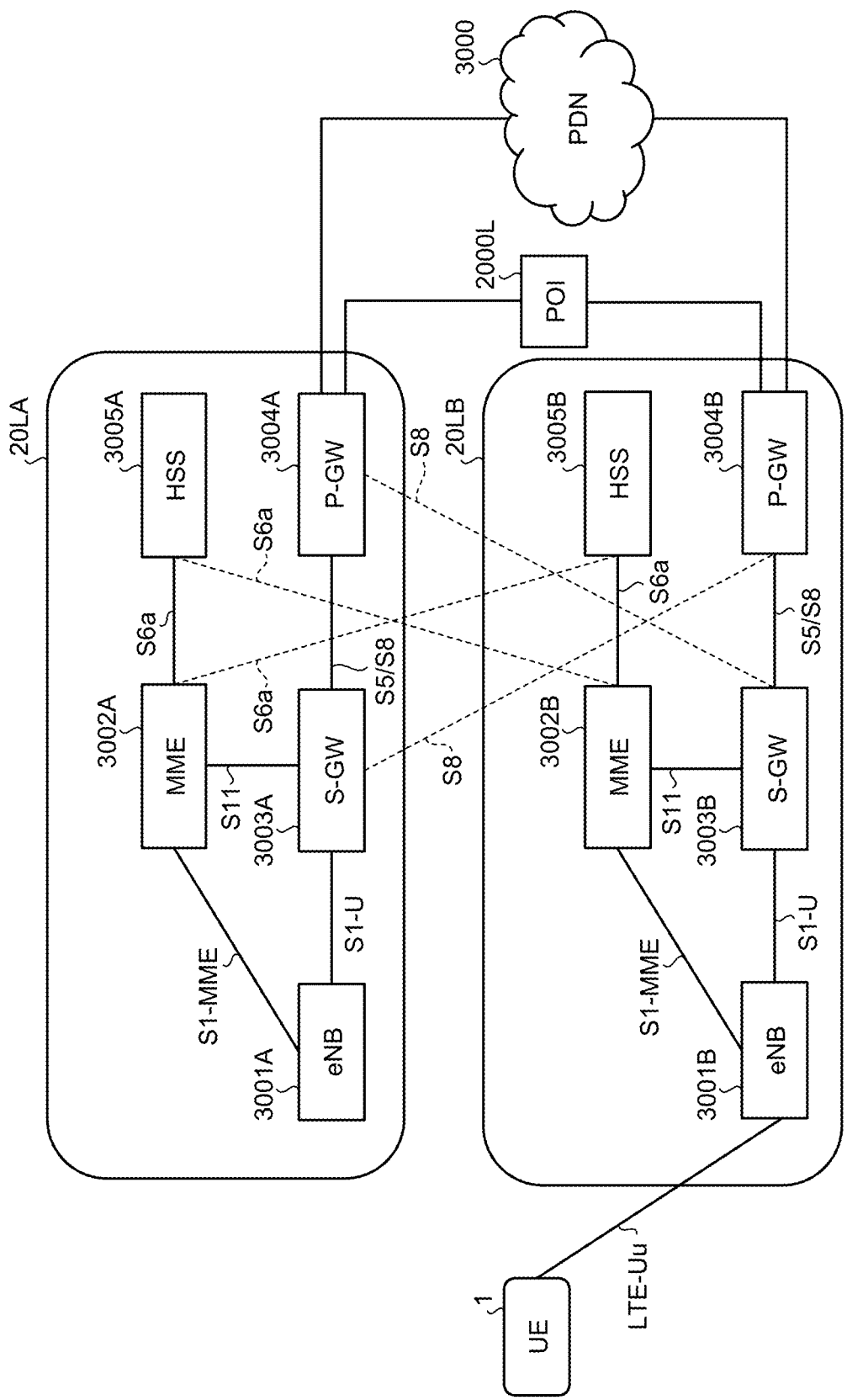
FIG. 23 is a diagram illustrating an example of a network architecture configuration of LTE.

In FIG. 23, interfaces provided for signal transmissions in the network 20L are each indicated by a solid line. As illustrated in FIG. 23, the eNB 3001 is connected with the MME 3002 through an S1-MME interface, and is connected with the S-GW 3003 through an S1-U interface. The S-GW 3003 is connected with the MME 3002 through an S11 interface, and the MME 3002 is connected with the HSS 3005 through an S6a interface. The P-GW 3004 is connected with the S-GW 3003 through an S5/S8 interface.

In addition, as illustrated by the dotted lines in FIG. 23, in a case where, for example, a roaming agreement is established between the first and second MNOs, interfaces for signal and data transmissions between the first and second networks 20LA and 20LB are provided. In the example of FIG. 23, the MME 3002B is connected with an HSS 3005A through the S6a interface, and the S-GW 3003B is connected with the P-GW 3004A through an S8 interface. An MME 3002A is connected with an HSS 3005B through the S6a interface, and the S-GW 3003A is connected with the P-GW 3004B through the S8 interface.

(State Transition)

Subsequently, a state transition of the UE 1 (or the wireless communication device 100) in LTE will be described. First, the state transition managed by the network 20 will be described, and then the state transition managed by the UE 1 will be described.

Figure 24:
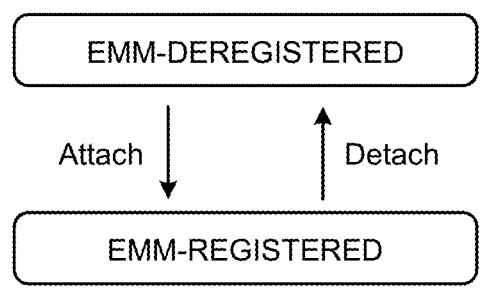
FIG. 24 is a diagram illustrating an example of the state transition in EMM.

First, the state transition of the UE 1 managed by the state management unit 131 of the management device 10 will be described with reference to FIGS. 24 and 25. In the case of LTE, the management device 10 manages two state transitions in EPS mobility management (EMM) and EPS connection management (ECM).

(EMM state Transition 1)

First, the state transition in the EMM will be described with reference to FIG. 24. FIG. 24 is a diagram illustrating an example of the state transition in the EMM.

The state transition in the EMM depends on whether the UE 1 is registered with the EPC. When the UE 1 is powered on and the UE 1 is registered with the management device 10, the management device 10 causes the UE 1 to transition to EMM-REGISTERED. Here, it is assumed that the management device 10 has the functions of the MME 3002 and the S-GW 3003, notifies the UE 1 of an IP address upon reception of an Attach request from the UE 1, establishes a default EPS bearer, and registers the UE 1. Alternatively, in a case where the management device 10 has the function of the MME 3002, the management device 10 may register the UE 1 to cause the UE 1 to transition to EMM-REGISTERED, when another apparatus having the function of the S-GW 3003 registers the UE 1.

When the UE 1 is powered off or the UE 1 goes out of a range, the management device 10 deletes the registration of the UE 1, and causes the state of the UE 1 to transition to EMM-DEREGISTERED. Upon reception of a Detach request from the UE 1, the management device 10 causes the state of the UE 1 to transition to EMM-DEREGISTERED.

Note that when the state of the UE 1 is EMM-DEREGISTERED, the UE 1 is not registered with the MME 3002 or the S-GW 3003, and the UE 1 is in a state of having neither the IP address nor the default EPS bearer.

(ECM State Transition 1)

Figure 25:
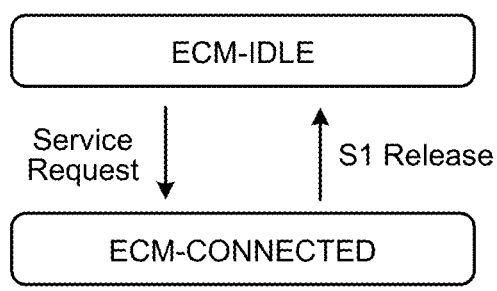
FIG. 25 is a diagram illustrating an example of the state transition in ECM.

FIG. 25 is a diagram illustrating an example of the state transition in the ECM. The management device 10 manages two states of ECM-IDLE and ECM-CONNECTED (or also referred to as EMM-IDLE and EMM-CONNECTED). Upon reception of a Service request from the UE 1, the management device 10 causes the state of the UE 1 to transition from ECM-IDLE to ECM-CONNECTED. Further, upon reception of an S1 Release from the UE 1, the management device 10 causes the state of the UE 1 to transition from ECM-CONNECTED to ECM-IDLE.

The state transition in the ECM depends on whether the UE 1 is in an active state or a standby state, from viewpoints of a non-access stratum (NAS) protocol and the EPC. That is, when the UE 1 is in the active state, the management device 10 sets the UE 1 to ECM-CONNECTED. In the case of this state, the management device 10 grasps eNB/gNB, to which the UE 1 belongs. In addition, a Signaling Radio Bearer is established with the UE 1, so that the UE 1 is capable of communicating control messages with the MME 3002. In addition, a Data Bearer is established with the UE 1, so that the UE 1 is capable of communicating data with the S-GW 3003.

On the other hand, when the UE 1 is in the standby state, the management device 10 sets the UE 1 to ECM-IDLE. In the case of ECM-IDLE, the network 20 releases an S1 Bearer and a Radio Bearer of the UE 1, but ensures the EPS Bearer to ensure a logical connection.

Note that in the case of the ECM-IDLE, the management device 10 does not accurately grasp the location of the UE 1, and manages the location of the UE 1 using a range of a tracking area (TA). Therefore, when the TA changes, the UE 1 conducts a TA Update. In addition, the management device 10 transmits a paging to the UE 1 for every TA, to which the UE 1 belongs.

(RRC State Transition 1)

Figure 26:
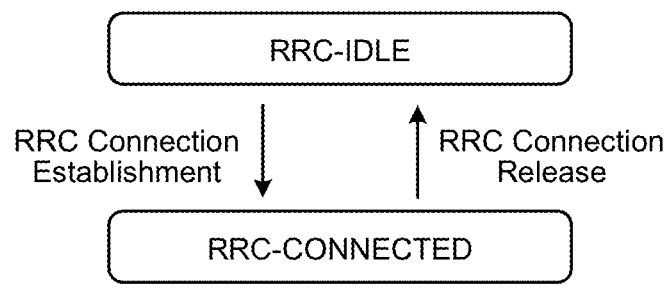
FIG. 26 is a diagram illustrating an example of the state transition in RRC.

Note that in LTE, for example, the eNB 3001 manages a state transition in the RRC. FIG. 26 is a diagram illustrating an example of the state transition in the RRC.

The state transition in the RRC depends on whether the UE 1 is in an active state or a standby state, from the viewpoints of an access stratum (AS) protocol and an evolved universal terrestrial radio access network (E-UTRAN). That is, when the UE 1 is in the active state, the eNB 3001 sets the UE 1 as RRC-CONNECTED. This state is a state transitioned from RRC-IDLE with a setup of RRC connection as a trigger, or from RRC_Inactive with Resume of RRC connection as a trigger. With the setup of the RRC connection as the trigger, the UE 1 recognizes the current cell as a Primary Cell (PCell). The UE 1 conducts communication using a control message on a signaling radio bearer (SRB) in the PCell that has been allocated.

On the other hand, when the UE 1 is in the standby state, the eNB 3001 sets the UE 1 to RRC-IDLE. In the case of this state, the radio access network (RAN) does not grasp the UE 1, and neither Serving eNB/en-gNB nor a Serving cell is allocated. In addition, an SRB1 is released. In RRC-IDLE, the UE 1 starts some limited communications (for example, reception of System information). For example, upon reception of a Paging request from the EPC, the RAN connects with the UE 1, by using the RRC Paging Message.

In addition, in a case where a connection is made from the UE 1 to the RAN or in a case of responding to the Paging Message, the UE 1 performs an RRC Connection Establishment process (for example, a Random Access procedure and an RRC (Connection) Setup procedure). In response to such a process, when the RAN accepts an establishment of the RRC Connection, the eNB 3001 causes the state of the UE 1 to transition to RRC-CONNECTED.

Note that, except for the transitional state, the UE 1 in the standby state is always managed as ECM-IDLE and RRC-IDLE, and the UE 1 in the active state is always managed as ECM-CONNECTED and RRC-CONNECTED.

(EMM state transition 2)

Figure 27:
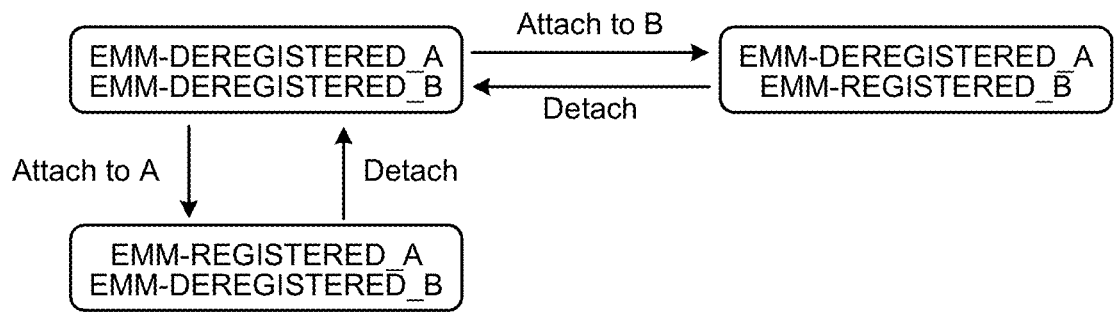
FIG. 27 is a diagram illustrating an example of the state transition in EMM in a wireless communication device.

Subsequently, the state transition in the EMM of the wireless communication device 100 will be described. FIG. 27 is a diagram illustrating an example of the state transition in the EMM of the wireless communication device 100. A state management unit 149 of the wireless communication device 100 manages, as the state of the UE 1, a registration state (EMM-REGISTERED) that is registered with the management device 10 and a non-registration state (EMM-DEREGISTERED) that is not registered, for every PLMN.

When the wireless communication device 100 is not registered with either the first management device 10A or the second management device 10B, for example, at the time of powering on, the wireless communication device manages both the first and second PLMNs as the non-registration state (EMM-DEREGISTERED_A, EMM-DEREGISTERED_B).

Here, it is assumed that a registration processing unit 147 of the wireless communication device 100 performs a first or second attach process for the first management device 10A. In this case, the wireless communication device 100 manages the first PLMN as the registration state (EMM-REGISTERED_A) and the second PLMN as the non-registration state (EMM-DEREGISTERED_B). Note that the first and second attach processes here are processes for requesting the registration with the management device 10, and are processes corresponding to the first and second registration processes in NR that has been described above.

That is, when the registration processing unit 147 of the wireless communication device 100 performs the second attach process for the first management device 10A, the first management device 10A manages the second PLMN as the visitor PLMN registration state (for example, EMM-REGISTERED-R_B).

In addition, when the registration processing unit 147 of the wireless communication device 100 performs the second attach process for the second management device 10B, the second management device 10B manages the first PLMN as the visitor PLMN registration state (for example, EMM-REGISTERED-R_A).

On the other hand, it is assumed that in the state of "EMM-REGISTERED_A, EMM-DEREGISTERED_B", a deregistration processing unit 148 of the wireless communication device 100 requests the first management device 10A for the registration deletion (detach) of the UE 1. In this case, the wireless communication device 100 manages both the first and second PLMNs as the non-registration state "EMM-DEREGISTERED_A, EMM-DEREGISTERED_B".

It is assumed that when both the first and second PLMNs are in the non-registration state (EMM-DEREGISTERED_A, EMM-DEREGISTERED_B), the wireless communication device 100 selects performing of the first or second attach process for the second management device 10B. In this case, the wireless communication device 100 causes the first PLMN to transition to the non-registration state (EMM-DEREGISTERED_A), and causes the second PLMN to transition to the registration state (EMM-REGISTERED_B).

In addition, in the state of "EMM-DEREGISTERED_A, EMM-REGISTERED_A", in a case of requesting the second management device 10B for the registration deletion of the UE 1, the wireless communication device 100 causes both the first and second PLMNs to transition to the non-registration state (EMM-DEREGISTERED_A, EMM-DEREGISTERED_A).

(ECM State Transition 2)

Figure 28:
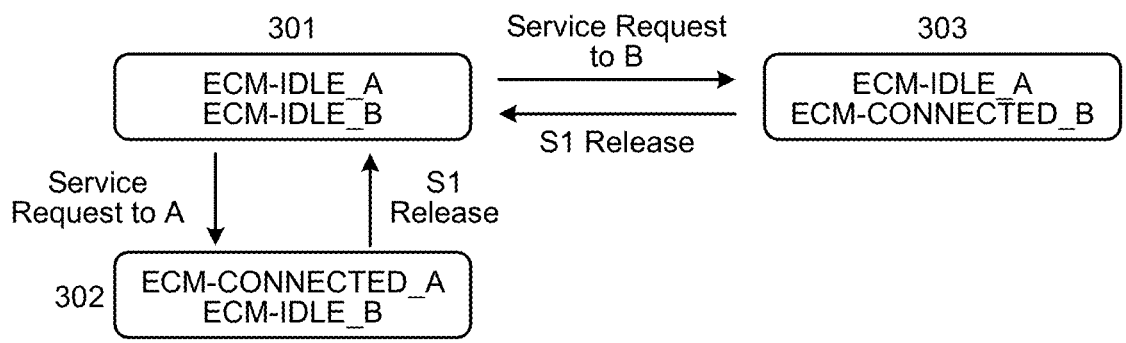
FIG. 28 is a diagram illustrating an example of the state transition in ECM in the wireless communication device.

Subsequently, the state transition in the ECM of the wireless communication device 100 will be described. FIG. 28 is a diagram illustrating an example of state transition in the ECM of the wireless communication device 100. The state management unit 149 of the wireless communication device 100 manages ECM-CONNECTED and ECM-IDLE respectively as the active state and the standby state of the UE 1, for every PLMN.

In a case where both the first and second PLMNs are ECM-IDLE (ECM-IDLE_A, ECM-IDLE_B), the wireless communication device 100 performs a Service request process for the first network 20A, and causes the first PLMN to transition to ECM-CONNECTED_A and the second PLMN to transition to ECM-IDLE_B.

On the other hand, when performing an S1 Release process from the first network 20A in the state of "ECM-CONNECTED_A, ECM-IDLE_B", the wireless communication device 100 causes both the first and second PLMNs to transition to ECM-IDLE (ECM-IDLE_A, ECM-IDLE_B).

When performing the Service request process for the second network 20B while both the first and second PLMNs are in the state of ECM-IDLE (ECM-IDLE_A, ECM-IDLE_B), the wireless communication device 100 causes the first PLMN to transition to ECM-IDLE_A and the second PLMN to transition to ECM-CONNECTED_B.

In addition, when performing the S1 Release process from the second network 20B in the state of "ECM-IDLE_A, ECM-CONNECTED_B", the wireless communication device 100 causes both the first and second PLMNs to transition to ECM-IDLE (ECM-IDLE_A, ECM-IDLE_B). (RRC State Transition 2)

Figure 29:
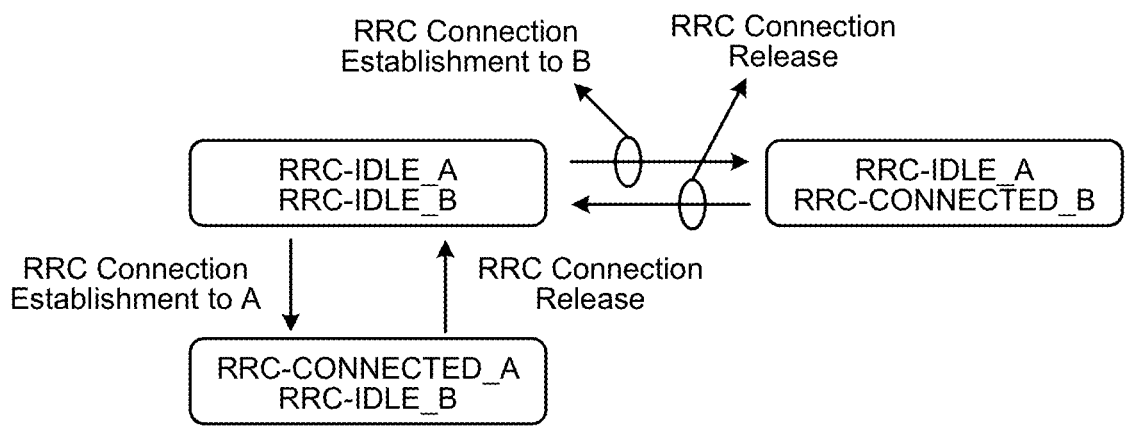
FIG. 29 is a diagram illustrating an example of the state transition in RRC in the wireless communication device.

Subsequently, the state transition in the RRC of the wireless communication device 100 will be described. FIG. 29 is a diagram illustrating an example of the state transition in the RRC of the wireless communication device 100. The state management unit 149 of the wireless communication device 100 manages RRC-CONNECTED and RRC-IDLE respectively as the active state and the standby state of the UE 1, for every PLMN.

In a case where both the first and second PLMNs are RRC-IDLE (RRC-IDLE_A, RRC-IDLE_B), the wireless communication device 100 performs an RRC Connection Establishment process on the RAN connected with the first network 20A, and causes the first PLMN to transition to RRC-CONNECTED_A (maintains the state of RRC-IDLE_B of the second PLMN).

On the other hand, when performing the RRC Connection Release process on the RAN connected with the first network 20A in the state of "RRC-CONNECTED_A, RRC-IDLE_B", the wireless communication device 100 causes the first PLMN to transition to RRC-IDLE (RRC-IDLE_A) (maintains the state of RRC-IDLE_B of the second PLMN).

When performing the RRC Connection Establishment process on the RAN connected with the second network 20B in the state of RRC-IDLE (RRC-IDLE_A, RRC-IDLE_B) in both the first and second PLMNs, the wireless communication device 100 causes the first PLMN to transition to RRC-IDLE_A and the second PLMN to transition to RRC-CONNECTED_B.

In addition, when performing the RRC Connection Release process on the RAN connected with the second network 20B in the state of "RRC-IDLE_A, RRC-CONNECTED_B", the wireless communication device 100 causes both the first and second PLMNs to transition to RRC-IDLE (RRC-IDLE_A, RRC-IDLE_B).

In this manner, even in a case where the communication system adopts LTE, for example, the first PLMN can be managed as the home PLMN, and the second PLMN can be managed as the visitor PLMN, similarly to a case of adopting NR. In addition, the wireless communication device 100 monitors the first and second paging occasions PO1 and PO2 as described above, so as to be capable of simultaneously waiting for the paging addressed to the first PLMN and the paging addressed to the second PLMN.

5.1.2. Application Example in Case where LTE and NR are Used Together

Next, a case where the first network 20LA adopts LTE and the second network 20B adopts NR will be described. In this case, it is assumed that, for example, in accordance with a roaming agreement, the MME 3002A, which belongs to the first network 20LA, and an AMF 1290B, which belongs to the second network 20B, are connected with each other.

In this case, the first management device 10A functions as the MME 3002A, and the second management device 10B functions as the AMF 1290B. In addition, the wireless communication device 100 manages the state transitions of the EMM, the ECM, and the RRC for the first PLMN, and manages the state transitions of the RM, the CM, and the RRC for the second PLMN.

In this manner, even in a case where the communication system adopts both LTE and NR, for example, the first PLMN can be managed as the home PLMN and the second PLMN can be managed as the visitor PLMN, similarly to the case of adopting NR. In addition, the wireless communication device 100 monitors the first and second paging occasions PO1 and PO2 as described above, so as to be capable of simultaneously waiting for the paging addressed to the first PLMN and the paging addressed to the second PLMN.

5.2. Application Example in Relation to Wireless Communication Device

First Application Example

Figure 30:
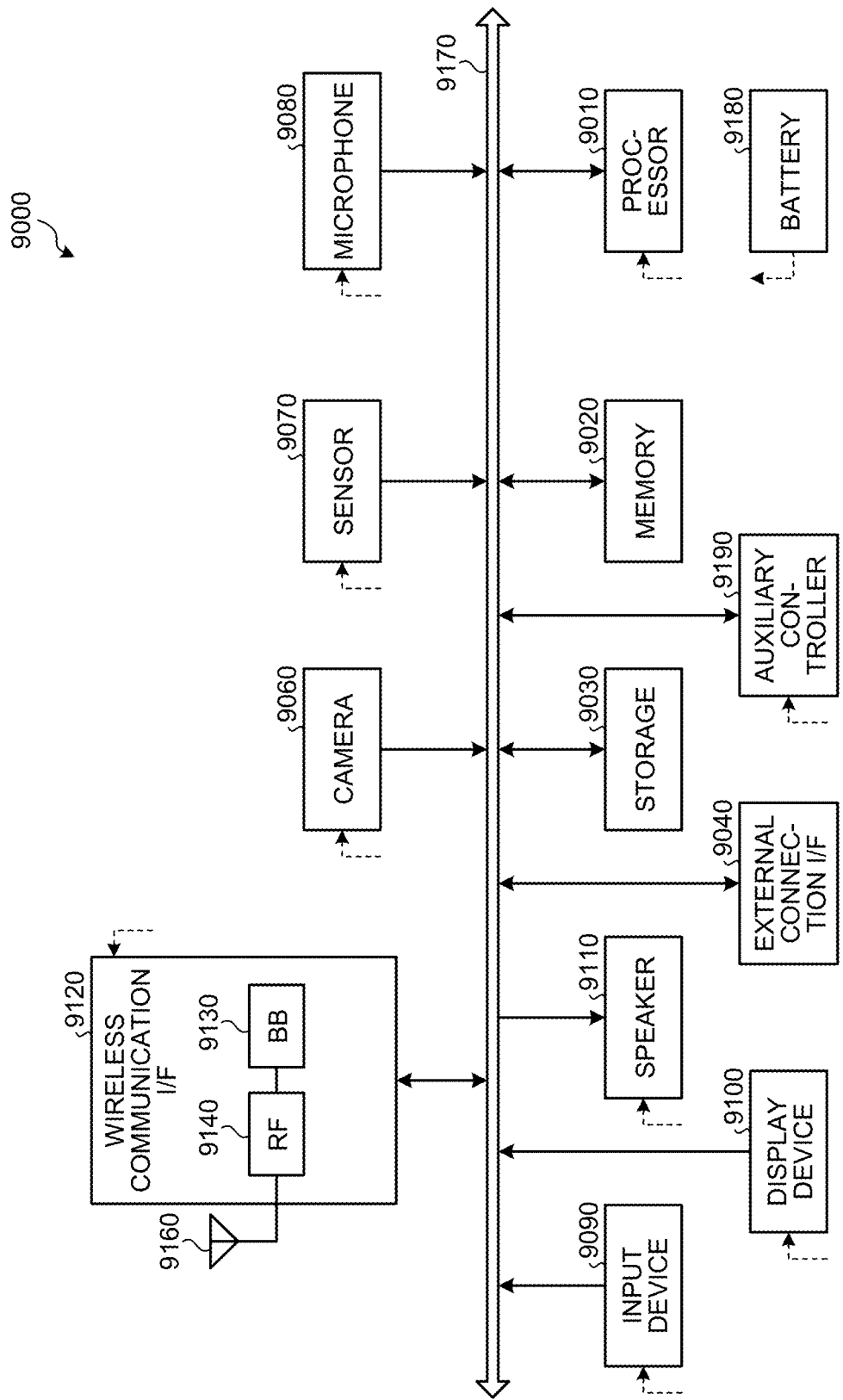
FIG. 30 is a block diagram illustrating an example of a schematic configuration of a smartphone to which the technology according to the present disclosure is applicable.

FIG. 30 is a block diagram illustrating an example of a schematic configuration of a smartphone 9000 to which the technology according to the present disclosure is applicable. The smartphone 9000 includes a processor 9010, a memory 9020, a storage 9030, an external connection interface 9040, a camera 9060, a sensor 9070, a microphone 9080, an input device 9090, a display device 9100, a speaker 9110, a wireless communication interface 9120, an antenna 9160, a bus 9170, a battery 9180, and an auxiliary controller 9190.

The processor 9010 may be, for example, a CPU or a system on chip (SoC), and controls functions of an application layer and other layers of the smartphone 9000. The memory 9020 includes a RAM and a ROM, and stores programs and data executed by the processor 9010. The storage 9030 can include a storage medium such as a semiconductor memory or a hard disk. The external connection interface 904 is an interface for connecting an external device, such as a memory card or a universal serial bus (USB) device, with the smartphone 9000.

The camera 9060 includes, for example, an imaging element such as a charge coupled device (CCD) or a complementary metal oxide semiconductor (CMOS), and generates a captured image. The sensor 9070 can include, for example, a group of sensors such as a positioning sensor, a gyro sensor, a geomagnetic sensor, and an acceleration sensor. The microphone 9080 converts sounds of voices input to the smartphone 9000 into audio signals. The input device 9090 includes, for example, a touch sensor that detects a touch on the screen of the display device 9100, a keypad, a keyboard, a button, a switch, or the like, and receives an operation or an information input from the user. The display device 9100 includes a screen such as a liquid crystal display (LCD) or an organic light emitting diode (OLED) display, and displays an output image of the smartphone 9000. The speaker 9110 converts audio signals output from the smartphone 9000 into sound of voices.

The wireless communication interface 9120 supports a cellular communication scheme such as NR or LTE, and conducts wireless communication. The wireless communication interface 9120 can typically include a BB processor 9130, an RF circuit 9140, and the like. The BB processor 9130 may, for example, encode/decode, modulate/demodulate, multiplex/demultiplex, and so on, and performs various signal processes for wireless communication. On the other hand, the RF circuit 9140 may include a mixer, a filter, an amplifier, and the like, and transmits and receives a wireless signal via the antenna 9160. The wireless communication interface 9120 may be a one-chip module into which the BB processor 9130 and the RF circuit 9140 are integrated.

Furthermore, in addition to the cellular communication scheme, the wireless communication interface 9120 may support other types of wireless communication schemes, such as a short-range wireless communication scheme, a proximity wireless communication scheme, or a wireless local area network (LAN) scheme, and in such a case, may include the BB processor 9130 and the RF circuit 9140 for each wireless communication scheme. Here, the short-range wireless communication scheme may include device to device (D2D) communication called sidelink.

The antenna 9160 includes a single or a plurality of antenna elements (for example, a plurality of antenna elements constituting a MIMO antenna), and is used for transmitting and receiving wireless signals by the wireless communication interface 9120.

The bus 9170 connects the processor 9010, the memory 9020, the storage 9030, the external connection interface 9040, the camera 9060, the sensor 9070, the microphone 9080, the input device 9090, the display device 9100, the speaker 9110, the wireless communication interface 9120, and the auxiliary controller 9190 with one another. The battery 9180 supplies the electric power to each block of the smartphone 9000 illustrated in FIG. 30 through power supply lines each partially indicated by a broken line in the drawing. The auxiliary controller 9190 operates minimum necessary functions of the smartphone 9000, for example, in a sleep mode.

In the smartphone 900 illustrated in FIG. 30, one or more constituent elements included in the controller 140 that have been described with reference to FIG. 11 may be implemented in the wireless communication interface 9120. Alternatively, at least some of these constituent elements may be implemented in the processor 9010 or the auxiliary controller 9190. As an example, the smartphone 9000 may be equipped with a module including a part (for example, the BB processor 9130) or all the wireless communication interface 9120, the processor 9010, and/or the auxiliary controller 9190, and the above one or more constituent elements may be implemented in the module. In this case, the above module may store a program (in other words, a program for causing a processor to perform the operation of the above one or more constituent elements) for causing the processor to function as the above one or more constituent elements, and may execute such a program. As another example, a program for causing a processor to function as the above one or more constituent elements may be installed in the smartphone 9000, so that the wireless communication interface 9120 (for example, the BB processor 9130), the processor 9010, and/or the auxiliary controller 9190 may execute the program. As described above, the smartphone 9000 or the above module may be provided as a device including the above one or more constituent elements, and a program for causing a processor to function as the above one or more constituent elements may be provided. Furthermore, a readable recording medium in which the above program is recorded may be provided.

Further, in the smartphone 9000 illustrated in FIG. 30, for example, the communication unit 120, which has been described with reference to FIG. 11, may be implemented in the wireless communication interface 9120 (for example, the RF circuit 9140). Further, the antenna unit 110 may be implemented in the antenna 9160. Further, the storage unit 130 may be implemented in the memory 9020.

Second Application Example

Figure 31:
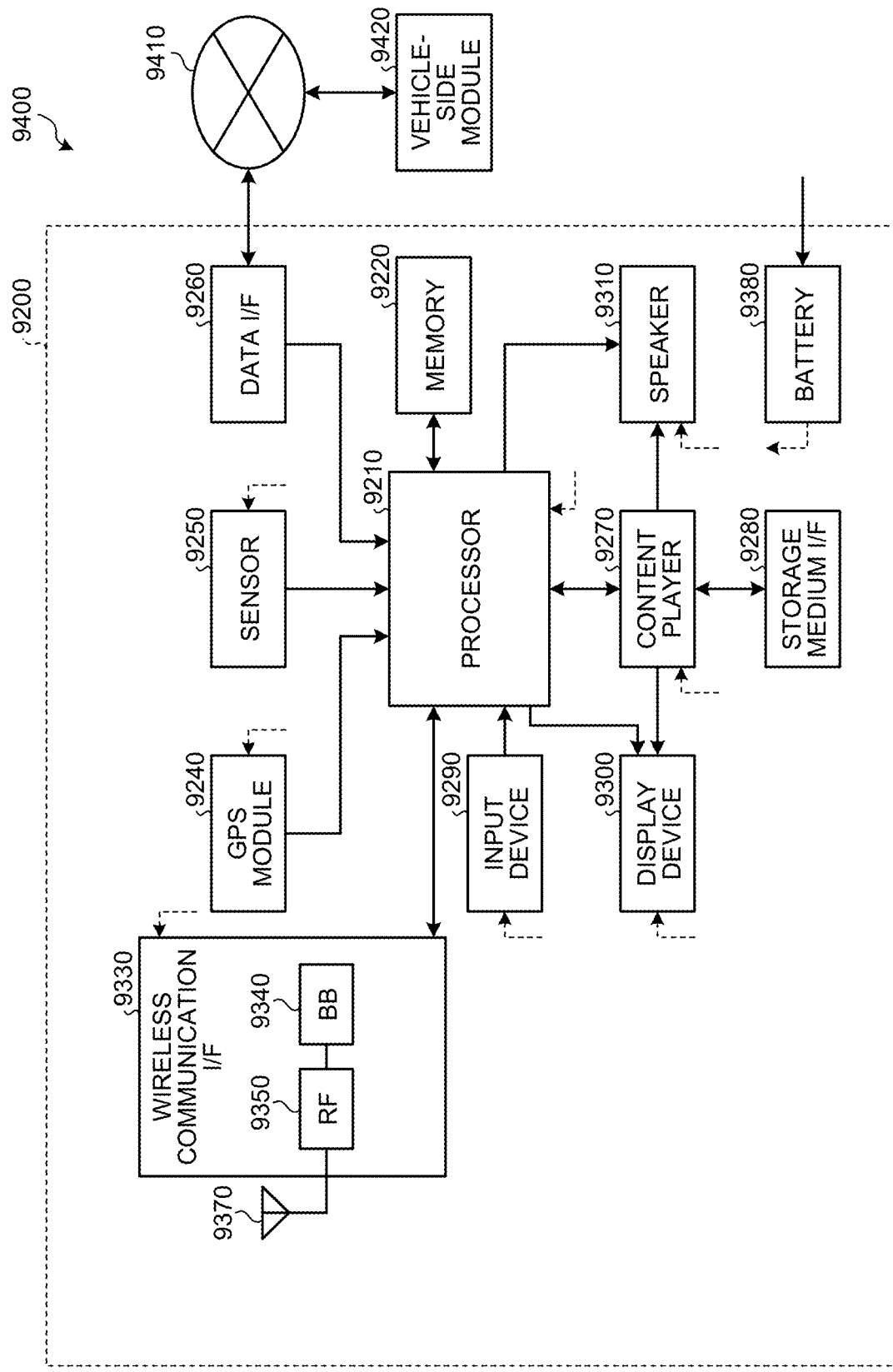
FIG. 31 is a block diagram illustrating an example of a schematic configuration of a car navigation device to which the technology according to the present disclosure is applicable.

FIG. 31 is a block diagram illustrating an example of a schematic configuration of a car navigation device 9200, to which the technology according to the present disclosure is applicable. The car navigation device 9200 includes a processor 9210, a memory 9220, a global positioning system (GPS) module 9240, a sensor 9250, a data interface 9260, a content player 9270, a storage medium interface 9280, an input device 9290, a display device 9300, a speaker 9310, a wireless communication interface 9330, an antenna 9370, and a battery 9380.

The processor 9210 may be, for example, a CPU or an SoC, and controls a navigation function and other functions of the car navigation device 9200. The memory 9220 includes a RAM and a ROM, and stores programs and data executed by the processor 9210.

The GPS module 9240 measures a location (for example, latitude, longitude, and altitude) of the car navigation device 9200, by using GPS signals received from a GPS satellite. The sensor 9250 can include, for example, a group of sensors such as a gyro sensor, a geomagnetic sensor, and an atmospheric pressure sensor. The data interface 9260 is connected with an in-vehicle network 9410 via, for example, a terminal, not illustrated, and acquires data generated on the vehicle side, such as vehicle speed data.

The content player 9270 reproduces a content stored in a storage medium (for example, a CD or DVD) to be inserted into the storage medium interface 9280. The input device 9290 includes, for example, a touch sensor that detects a touch on the screen of the display device 9300, a button, a switch, or the like, and receives an operation or an information input from the user. The display device 9300 includes a screen such as an LCD or an OLED display, and displays a navigation function or an image of a content to be reproduced. The speaker 9310 outputs sounds of a navigation function or the content to be reproduced.

The wireless communication interface 9330 supports a cellular communication scheme such as NR or LTE, and conducts wireless communication. The wireless communication interface 9330 can typically include a BB processor 9340, an RF circuit 9350, and the like. The BB processor 9340 may, for example, encode/decode, modulate/demodulate, multiplex/demultiplex, and so on, and performs various signal processes for wireless communication. On the other hand, the RF circuit 9350 may include a mixer, a filter, an amplifier, and the like, and transmits and receives a wireless signal via the antenna 9370. The wireless communication interface 9330 may be a one-chip module into which the BB processor 9340 and the RF circuit 9350 are integrated.

Furthermore, in addition to the cellular communication scheme, the wireless communication interface 9330 may support other types of wireless communication schemes, such as a short-range wireless communication scheme, a proximity wireless communication scheme, or a wireless LAN scheme, and in such a case, may include the BB processor 9340 and the RF circuit 9350 for each wireless communication scheme. Here, the short-range wireless communication scheme may include device to device (D2D) communication called sidelink.

The antenna 9370 includes a single or a plurality of antenna elements (for example, a plurality of antenna elements constituting a MIMO antenna), and is used for transmitting and receiving wireless signals by the wireless communication interface 9330.

The battery 9380 supplies the electric power to each block of the car navigation device 9200 illustrated in FIG. 31 through power supply lines each partially indicated by a broken line in the drawing. In addition, the battery 9380 accumulates the electric power supplied from the vehicle side.

In the car navigation device 9200 illustrated in FIG. 31, one or more constituent elements included in the controller 140 that have been described with reference to FIG. 11 may be implemented in the wireless communication interface 9330. Alternatively, at least some of these constituent elements may be implemented in the processor 9210. As an example, the car navigation device 9200 may be equipped with a module including a part (for example, the BB processor 9340) or all of the wireless communication interface 9330 and/or the processor 9210, and the above one or more constituent elements may be implemented in the module. In this case, the above module may store a program (in other words, a program for causing a processor to perform the operation of the above one or more constituent elements) for causing the processor to function as the above one or more constituent elements, and may execute such a program. As another example, a program for causing a processor to function as the above one or more constituent elements may be installed in the car navigation device 9200, so that the wireless communication interface 9330 (for example, the BB processor 9340) and/or the processor 9210 may execute the program. As described above, the car navigation device 9200 or the above module may be provided as a device including the above one or more constituent elements, and a program for causing a processor to function as the above one or more constituent elements may be provided. Furthermore, a readable recording medium in which the above program is recorded may be provided.

In addition, in the car navigation device 9200 illustrated in FIG. 31, for example, the communication unit 120 that has been described with reference to FIG. 11 may be implemented in the wireless communication interface 9330 (for example, the RF circuit 9350). Further, the antenna unit 110 may be implemented in the antenna 9370. Further, the storage unit 130 may be implemented in the memory 9220.

Further, the technology according to the present disclosure may be achieved as an in-vehicle system (or a vehicle) 9400 including one or more blocks of the above-described car navigation device 9200, the in-vehicle network 9410, and a vehicle-side module 9420. The vehicle-side module 9420 generates vehicle-side data, such as a vehicle speed, an engine speed, and information of a camera and various sensors mounted on the vehicle or failure information, and outputs the generated data to the in-vehicle network 9410.

5.3. Other Application Examples

In the above-described embodiments, the wireless communication device 100 conducts communication by switching between the first and second networks 20A and 20B respectively operated by the first and second MNOs, without limitation to this. One of the networks in which the wireless communication device 100 conducts communication may be, for example, a network managed and operated by a service provider other than the MNO. Examples of such a network include a private network (Private Network), a non-public network (non-Public Network), a neutral host network (Neutral Host Network), and the like. In addition, examples of the service provider that operates such a network include an owner of a factory, a hospital that uses an operating room, a retailer that operates a store, and the like.

In addition, in the above-described embodiments, the SIM 30, the first and second subscriber modules are mounted on the UE 1. However, it is sufficient if the SIM 30 is capable of identifying a subscriber of a service provided by the MNO, and may be, for example, a universal subscriber identity module (USIM) used in LTE or a next generation (NextGen) USIM for 5G.

Further, the SIM 30 is not limited to a removable SIM card, and may be, for example, an embedded SIM (eSIM) or an integrate SIM (integrate SIM) configured inside the SoC. In addition, the eSIM and the integrate SIM may be downloadable (Downloadable) SIMs that are writable or updatable contents to be held through an external device, or a wired or wireless network. The downloadable SIM may also be called, for example, a soft SIM or a software SIM.

<6. Modifications>

In addition, the control device that controls the management device 10 and the wireless communication device 100 in the present embodiment may be achieved by a dedicated computer system or may be achieved by a general-purpose computer system.

For example, a program for performing the above-described operations is stored and distributed in a computer-readable recording medium such as an optical disk, a semiconductor memory, a magnetic tape, a flexible disk, or a hard disk. Then, for example, such a program is installed in a computer, and the above-described processes are performed so as to configure the control device. In this situation, the control device may be an external device (for example, a personal computer) of the management device 10 or the wireless communication device 100. In addition, the control device may be the management device 10 or a device (for example, the controller 13 or the controller 140) inside the wireless communication device 100.

In addition, the above communication program may be stored in a disk device equipped in a server device on a network such as the Internet, so that the communication program can be downloaded to a computer. In addition, the above-described functions may be achieved by cooperation of an operating system (OS) and application software. In this case, a part other than the OS may be stored and distributed in a medium, or a part other than the OS may be stored in a server device to be downloadable to a computer.

In addition, out of the processes that have been described in the above embodiments, all or a part of the processes that have been described as being automatically performed can be manually performed, or all or a part of the processes that have been described as being manually performed can be automatically performed by a known method. In addition to this, the processing procedures, the specific names, and the information including various types of data and parameters illustrated in the above descriptions and the drawings can be optionally changed, unless otherwise specified. For example, various types of information that have been illustrated in each drawing are not limited to the illustrated information.

Further, each constituent element of each device that has been illustrated in the drawings is functionally conceptual, and is not necessarily physically configured as illustrated in the drawings. That is, a specific form of distribution and integration of each device is not limited to the illustrated form, and all or a part of each device can be functionally or physically distributed and integrated in an optional unit in accordance with various types of loads, use conditions, and the like.

In addition, the embodiments that have been described can be appropriately combined in a scope in which the processing contents do not contradict each other.

<7. Conclusion>

As described above, according to an embodiment of the present disclosure, a wireless communication device (for example, the wireless communication device 100) includes a controller (for example, the controller 140). The controller (the controller 140) transmits a registration request message to a first management device (for example, the first management device 10A) that belongs to the first PLMN and that manages registration of the wireless communication device. The registration request message includes second PLMN_ID information (for example, the second PLMN ID). The second PLMN_ID information is stored in the second subscriber identity module (for example, the second SIM 30B), and is also included in the first PLMN list information (for example, the first PLMN list 40) stored in the first subscriber identity module (for example, the first SIM 30A).

The controller receives, from a first base station (for example, the first base station 200A) that belongs to the first PLMN, the first paging message related to a first paging that has been generated in the first PLMN. The controller receives, from the first base station, a second paging message related to a second paging that has been generated in the second PLMN.

Accordingly, in a case where the second PLMN ID is included in the first PLMN list, the first management device and the wireless communication device are capable of managing the first PLMN as the home PLMN and the second PLMN as the visitor PLMN. In addition, the wireless communication device is capable of receiving, from the first base station, not only the paging from the first PLMN but also the paging from the second PLMN.

Heretofore, the embodiments of the present disclosure have been described above. However, the technical scope of the present disclosure is not limited to the above-described embodiments as it is, and various modifications can be made without departing from the gist of the present disclosure. In addition, constituent elements in different embodiments and modifications may be appropriately combined together.

Further, the effects of each embodiment described in the present specification are merely examples and are not limited, and other effects may be provided.

Note that the present technology can also have the following configurations.

(1)
A wireless communication device comprising:
a controller configured to transmit a registration request message to a first management device that belongs to a first PLMN and that manages registration of the wireless communication device,
the registration request message including second PLMN ID information,
the second PLMN_ID information being also included in first PLMN list information that is stored in a second subscriber identity module and that is stored in a first subscriber identity module,
the controller receiving, from a first base station that belongs to the first PLMN, a first paging message related to a first paging that has been generated in the first PLMN, and
the controller receiving, from the first base station, a second paging message related to a second paging that has been generated in the second PLMN.

(2)
The wireless communication device according to (1), wherein
the controller specifies a first paging occasion in which the first paging message is arranged and a second paging occasion in which the second paging message is arranged, by using at least one of identification information of the wireless communication device and system information received from the first base station.

(3)
The wireless communication device according to (2), wherein
the controller
specifies a subframe number of the first paging occasion and a system frame number of a first paging frame including the first paging occasion, by using the identification information of the wireless communication device allocated from the first PLMN, and
specifies a subframe number of the second paging occasion and a system frame number of a second paging frame including the second paging occasion, by using the identification information of the wireless communication device allocated from the second PLMN.

(4)
The wireless communication device according to (2), wherein
the controller
specifies a subframe number of the first paging occasion and a system frame number of a first paging frame including the first paging occasion, by using the identification information of the wireless communication device allocated from the first PLMN, and
specifies a subframe number of the second paging occasion, based on the subframe number of the first paging occasion.

(5)
The wireless communication device according to (4), wherein
the controller specifies the subframe number of the second paging occasion, by adding an offset value to the subframe number of the first paging occasion.

(6)
The wireless communication device according to (5), wherein
the controller specifies the subframe number of the second paging occasion, based on the offset value that has been preset.

(7)
The wireless communication device according to (5), wherein
the controller specifies a frame number of the second paging occasion, based on the offset value included in the system information reported from the first base station.

(8)
The wireless communication device according to (2), wherein
the first paging occasion and the second paging occasion are identical to each other, and
the controller receives either the first paging message or the second paging message via the first paging occasion.

(9)
The wireless communication device according to (8), wherein
the controller determines whether the paging message is the first paging message or the second paging message, based on the identification information of the wireless communication device included in the paging message that has been received via the first paging occasion.

(10)

The wireless communication device according to (9), wherein
the controller receives the paging message that the first base station transmits in accordance with priority information related to priorities of the first paging and the second paging.

(11)

The wireless communication device according to (10), wherein
the controller notifies the first base station of the priority information.

(12)

The wireless communication device according to (10), wherein
when requesting the registration to the first management device, the controller notifies of the priority information related to the priorities of the first paging and the second paging.

(13)

A base station that belongs to a first PLMN, the base station comprising:
a controller configured to transmit a first paging message related to a first paging that has been generated in the first PLMN to a wireless communication device that has transmitted a registration request message and that has been registered with a first management device that belongs to the first PLMN,
the registration request message including second PLMN_ID information,
the second PLMN_ID information being also included in first PLMN list information that is stored in a second subscriber identity module and that is stored in a first subscriber identity module, and
the controller transmitting, to the wireless communication device, a second paging message related to a second paging that has been generated in a second PLMN.

(14)

A communication control method comprising:
transmitting a registration request message to a first management device that belongs to a first PLMN and that manages registration of a wireless communication device,
the registration request message including second PLMN_ID information, and
the second PLMN_ID information being also included in first PLMN list information that is stored in a second subscriber identity module and that is stored in a first subscriber identity module;
receiving, from a first base station that belongs to the first PLMN, a first paging message related to a first paging that has been generated in the first PLMN; and
receiving, from the first base station, a second paging message related to a second paging that has been generated in the second PLMN.

REFERENCE SIGNS LIST

1 UE
10 MANAGEMENT DEVICE
11 NETWORK COMMUNICATION UNIT
12, 130, 240 STORAGE UNIT
13, 140, 250 CONTROLLER
30 SIM
100 WIRELESS COMMUNICATION DEVICE
120 COMMUNICATION UNIT
200 BASE STATION

The invention claimed is:

1. A wireless communication device comprising:
a transceiver; and
control circuitry configured to:
transmit a registration request message to a first management device that belongs to a first public land mobile network (PLMN) and that manages registration of the wireless communication device,
the registration request message including second PLMN_ID information,
the second PLMN_ID information being also included in first PLMN list information that is stored in a second subscriber identity module and that is stored in a first subscriber identity module,
receive, from a first base station that belongs to the first PLMN, a first paging message related to a first paging that has been generated in the first PLMN, and
receive, from the first base station, a second paging message related to a second paging that has been generated in the second PLMN,
wherein the control circuitry:
specifies a first paging occasion in which the first paging message is arranged and a second paging occasion in which the second paging message is arranged, by using at least one of identification information of the wireless communication device and system information received from the first base station,
specifies a subframe number of the first paging occasion and a system frame number of a first paging frame including the first paging occasion, by using the identification information of the wireless communication device allocated from the first PLMN, and
specifies a subframe number of the second paging occasion, based on the subframe number of the first paging occasion.

2. The wireless communication device according to claim 1,
wherein the control circuitry further specifies a system frame number of a second paging frame including the second paging occasion, by using the identification information of the wireless communication device allocated from the second PLMN.

3. The wireless communication device according to claim 1, wherein
the control circuitry specifies the subframe number of the second paging occasion, by adding an offset value to the subframe number of the first paging occasion.

4. The wireless communication device according to claim 3, wherein
the control circuitry specifies the subframe number of the second paging occasion, based on the offset value that has been preset.

5. The wireless communication device according to claim 3, wherein
the control circuitry specifies a frame number of the second paging occasion, based on the offset value included in the system information reported from the first base station.

6. The wireless communication device according to claim 1, wherein
the first paging occasion and the second paging occasion are identical to each other, and
the control circuitry receives either the first paging message or the second paging message via the first paging occasion.

7. The wireless communication device according to claim 6, wherein
the control circuitry determines whether the paging message is the first paging message or the second paging message, based on the identification information of the wireless communication device included in the paging message that has been received via the first paging occasion.

8. The wireless communication device according to claim 7, wherein
the control circuitry receives the paging message that the first base station transmits in accordance with priority information related to priorities of the first paging and the second paging.

9. The wireless communication device according to claim 8, wherein
the control circuitry notifies the first base station of the priority information.

10. The wireless communication device according to claim 8, wherein
when requesting the registration to the first management device, the control circuitry notifies of the priority information related to the priorities of the first paging and the second paging.

11. A communication control method performed by a wireless communication device, the method comprising:
transmitting a registration request message to a first management device that belongs to a first public land mobile network (PLMN) and that manages registration of a wireless communication device,
the registration request message including second PLMN_ID information, and
the second PLMN_ID information being also included in first PLMN list information that is stored in a second subscriber identity module and that is stored in a first subscriber identity module;
receiving, from a first base station that belongs to the first PLMN, a first paging message related to a first paging that has been generated in the first PLMN; and
receiving, from the first base station, a second paging message related to a second paging that has been generated in the second PLMN,
wherein the method further comprises:
specifying a first paging occasion in which the first paging message is arranged and a second paging occasion in which the second paging message is arranged, by using at least one of identification information of the wireless communication device and system information received from the first base station,
specifying a subframe number of the first paging occasion and a system frame number of a first paging frame including the first paging occasion, by using the identification information of the wireless communication device allocated from the first PLMN, and
specifying a subframe number of the second paging occasion, based on the subframe number of the first paging occasion.

12. A non-transitory computer product containing instructions for a communication control method performed by a wireless communication device, the method comprising:
transmitting a registration request message to a first management device that belongs to a first public land mobile network (PLMN) and that manages registration of a wireless communication device,
the registration request message including second PLMN_ID information, and
the second PLMN_ID information being also included in first PLMN list information that is stored in a second subscriber identity module and that is stored in a first subscriber identity module;
receiving, from a first base station that belongs to the first PLMN, a first paging message related to a first paging that has been generated in the first PLMN; and
receiving, from the first base station, a second paging message related to a second paging that has been generated in the second PLMN,
wherein the method further comprises:
specifying a first paging occasion in which the first paging message is arranged and a second paging occasion in which the second paging message is arranged, by using at least one of identification information of the wireless communication device and system information received from the first base station,
specifying a subframe number of the first paging occasion and a system frame number of a first paging frame including the first paging occasion, by using the identification information of the wireless communication device allocated from the first PLMN, and
specifying a subframe number of the second paging occasion, based on the subframe number of the first paging occasion.

* * * * *